(12) United States Patent
Ohno et al.

(10) Patent No.: US 10,732,102 B2
(45) Date of Patent: Aug. 4, 2020

(54) OPTICAL TEST APPARATUS AND OPTICAL TEST METHOD

(71) Applicant: KABUSHIKI KAISHA TOSHIBA, Tokyo (JP)

(72) Inventors: Hiroshi Ohno, Yokohama Kanagawa (JP); Hiroya Kano, Kawasaki Kanagawa (JP); Hideaki Okano, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/111,335

(22) Filed: Aug. 24, 2018

(65) Prior Publication Data

US 2019/0219501 A1 Jul. 18, 2019

(30) Foreign Application Priority Data

Jan. 15, 2018 (JP) .................................... 2018-4556

(51) Int. Cl.
*G01N 21/45* (2006.01)
*G01M 11/02* (2006.01)
(Continued)

(52) U.S. Cl.
CPC ........... *G01N 21/455* (2013.01); *G01B 11/14* (2013.01); *G01M 11/0207* (2013.01); *G01N 21/41* (2013.01); *G01N 21/47* (2013.01)

(58) Field of Classification Search
CPC .......... G02B 5/20; G02B 5/201; G02B 5/204; G02B 5/22; G02B 5/226; G02B 5/23;
(Continued)

(56) References Cited

U.S. PATENT DOCUMENTS 2,655,077 A * 10/1953 Bennett .................. G02B 21/14
359/370
2,700,918 A * 2/1955 Osterberg .............. G02B 21/14
359/371
(Continued)

FOREIGN PATENT DOCUMENTS

JP H10-293834 11/1998
JP 2006-253201 9/2006
(Continued)

OTHER PUBLICATIONS

W.L. Howes, "Rainbow schlieren and its applications", Applied Optics, vol. 23, No. 14, p. p. 2449-2460, Jul. 1984.
(Continued)

*Primary Examiner* — Gordon J Stock, Jr.
(74) *Attorney, Agent, or Firm* — Finnegan, Henderson, Farabow, Garrett & Dunner, L.L.P.

(57) ABSTRACT

According to one embodiment, an optical test apparatus includes a first aperture, a second aperture, an image sensor, and a first lens. The first aperture includes a first aperture plane provided with a first wavelength selecting region. The second aperture includes a second aperture plane provided with a second wavelength selecting region different from the first wavelength selecting region. The image sensor is configured to image a light beam passing through the first aperture plane and the second aperture plane and reaching an imaging plane. The first lens is configured to make a light beam passing through the first aperture plane and the second aperture plane be incident on the imaging plane.

16 Claims, 12 Drawing Sheets

(51) Int. Cl.
*G01B 11/14* (2006.01)
*G01N 21/41* (2006.01)
*G01N 21/47* (2006.01)

(58) Field of Classification Search
CPC .......... G02B 5/26; G02B 5/28; G02B 5/1876;
G02B 21/00; G02B 21/0004; G02B
21/0032; G02B 21/004; G02B 21/0044;
G02B 21/0052; G02B 21/0064; G02B
21/008; G02B 21/088; G02B 21/10;
G02B 21/12; G02B 21/125; G01N 21/41;
G01N 21/4133; G01N 21/45; G01N
21/455; G01N 21/47; G01N 2021/4173;
G01N 2021/4193; G01N 2021/4153;
G01N 2021/4721; G01N 2021/4728;
G01J 9/00; G01J 2009/002; G01J
2009/004; G01M 11/02; G01M 11/0207;
G01M 11/0228; G01M 11/0235; G01M
11/0257; G01M 11/0221; G01M 11/0242;
G01M 11/0271; G01B 11/14; G01B 11/22
See application file for complete search history.

(56) References Cited

U.S. PATENT DOCUMENTS

| | | | | |
|---|---|---|---|---|
| 6,317,261 B1 * | 11/2001 | Otaki | .................... | G02B 21/06 359/368 |
| 7,336,371 B1 * | 2/2008 | Haidner | ............. | G01M 11/0271 356/515 |
| 8,159,675 B2 * | 4/2012 | Kiyota | ................... | G01N 21/25 356/416 |
| 8,351,116 B2 * | 1/2013 | Suenaga | ................ | G02B 21/14 359/370 |
| 2010/0066854 A1 * | 3/2010 | Mather | ................... | G02B 5/005 348/222.1 |
| 2011/0311132 A1 * | 12/2011 | Meimoun | ............ | A61B 3/1015 382/162 |
| 2018/0231788 A1 * | 8/2018 | Engelhardt | ........ | G02B 27/0927 |
| 2019/0364267 A1 * | 11/2019 | Ohno | ................... | H04N 17/002 |

FOREIGN PATENT DOCUMENTS

| | | |
|---|---|---|
| JP | 2012-173130 | 9/2012 |
| JP | 2013-246052 | 12/2013 |
| JP | 2014-168763 | 9/2014 |

OTHER PUBLICATIONS

R.J. Woodham, "Gradient and curvature from the photometric-stereo method, including local confidence estimation", Journal of the Optical Society of America A, vol. 11, Issue 11, pp. 3050-3068, 1994.

* cited by examiner

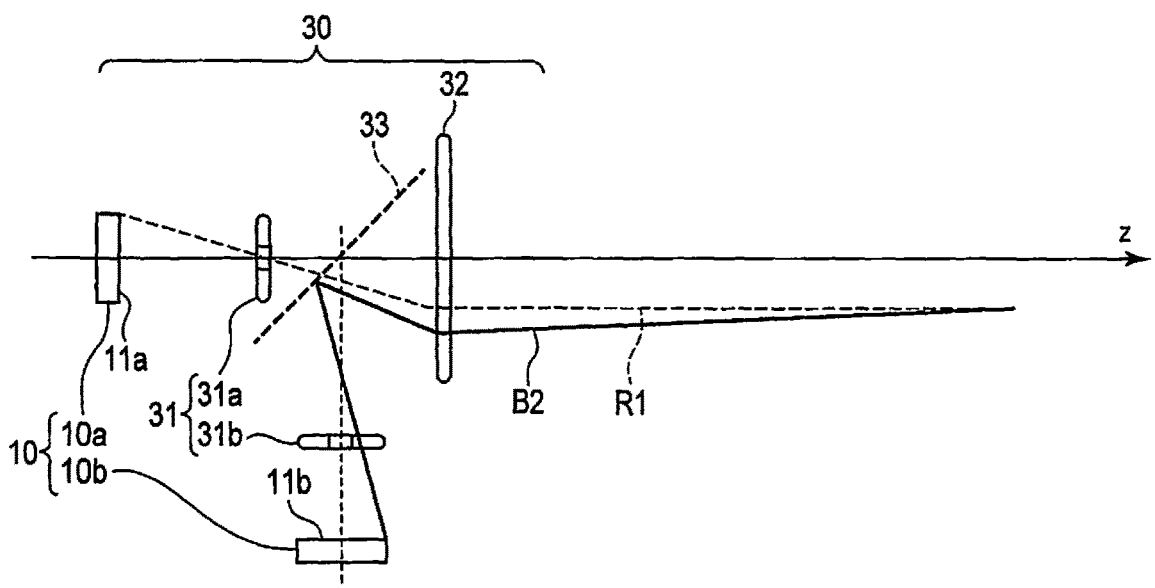
F I G. 9
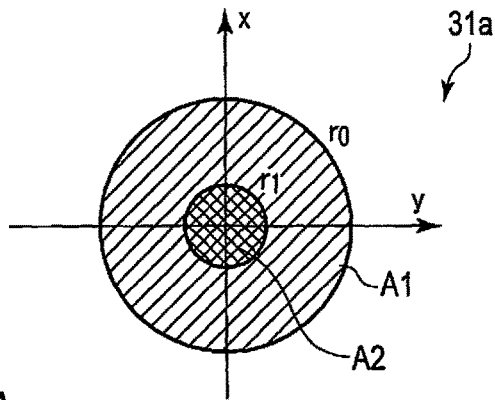
F I G. 10A
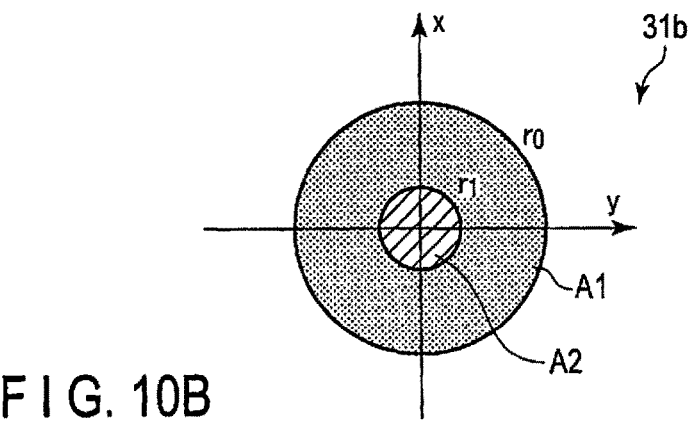
F I G. 10B

OPTICAL TEST APPARATUS AND OPTICAL TEST METHOD

CROSS-REFERENCE TO RELATED APPLICATION

This application is based upon and claims the benefit of priority from Japanese Patent Application No. 2018-4556, filed Jan. 15, 2018, the entire contents of which are incorporated herein by reference.

FIELD

Embodiments described herein relate generally to an optical test apparatus and an optical test method.

BACKGROUND

In various industries, contactless test techniques have become important. There are conventional contactless test apparatuses designed to measure spatial fields by using schlieren methods.

The conventional schlieren methods can discriminate the presence/absence of a refractive index distribution or scattering but have difficulty in quantitatively measuring the magnitude of a refractive index or scattering. Under the circumstance, a technique using a color opening is available as a quantitative measurement method.

BRIEF DESCRIPTION OF THE DRAWINGS

FIG. 9 is a schematic view schematically showing an example of the arrangement of a light emission side optical element group according to the fifth modification of the first embodiment, explaining a light beams after passing through the first light emission side aperture;

FIG. 10A is an x-y sectional view showing an example of the arrangement of a second light emission side aperture (first light emission side aperture) according to the fifth modification of the first embodiment;

FIG. 10B is an x-y sectional view showing an example of the arrangement of a third light emission side aperture (first light emission side aperture) according to the fifth modification of the first embodiment;

DETAILED DESCRIPTION

Figure 1:
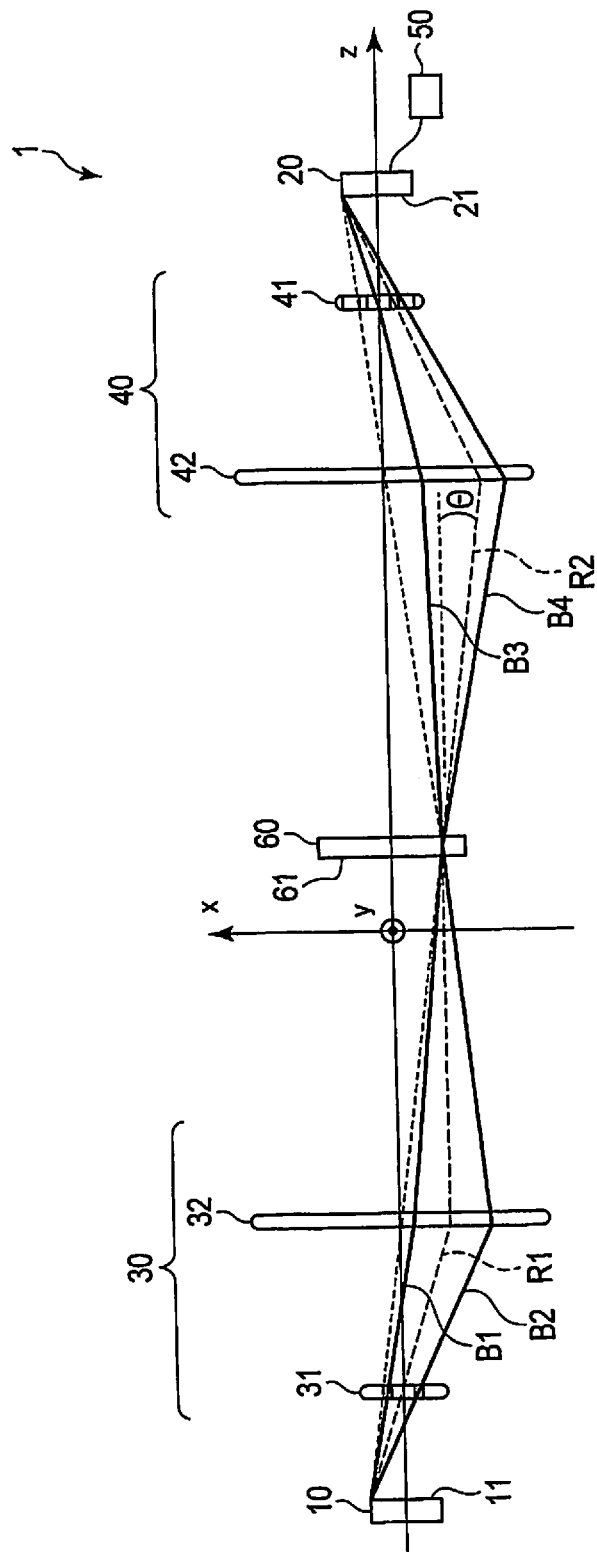
FIG. 1 is a schematic view schematically showing an example of the arrangement of an optical test apparatus according to the first embodiment.

According to one embodiment, an optical test apparatus includes a first aperture, a second aperture, an image sensor, and a first lens. The first aperture includes a first aperture plane provided with a first wavelength selecting region. The second aperture includes a second aperture plane provided with a second wavelength selecting region different from the first wavelength selecting region. The image sensor is configured to image a light beam passing through the first aperture plane and the second aperture plane and reaching an imaging plane. The first lens is configured to make a light beam passing through the first aperture plane and the second aperture plane be incident on the imaging plane.

Various Embodiments will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

First Embodiment

The arrangement of an optical test apparatus 1 according to this embodiment will be described first in detail below with reference to the accompanying drawings.

Figure 2:
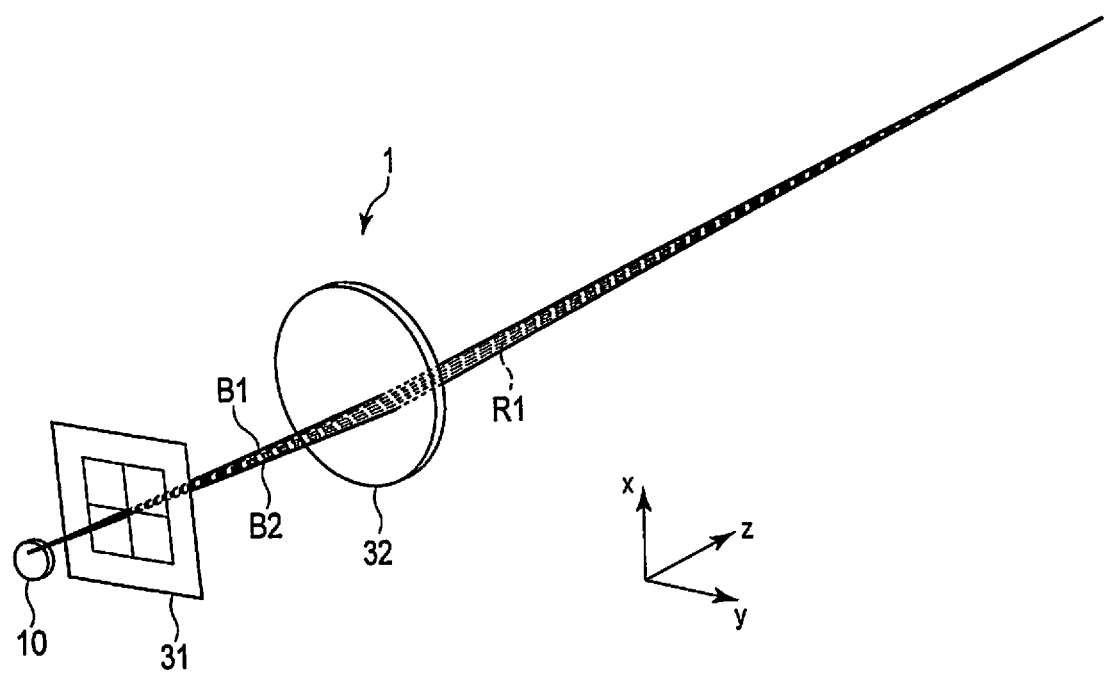
FIG. 2 is a bird's eye view schematically showing an example of the arrangement of a light emission side optical element group according to the first embodiment, explaining light beams after passing through a first light emission side aperture.
Figure 3:
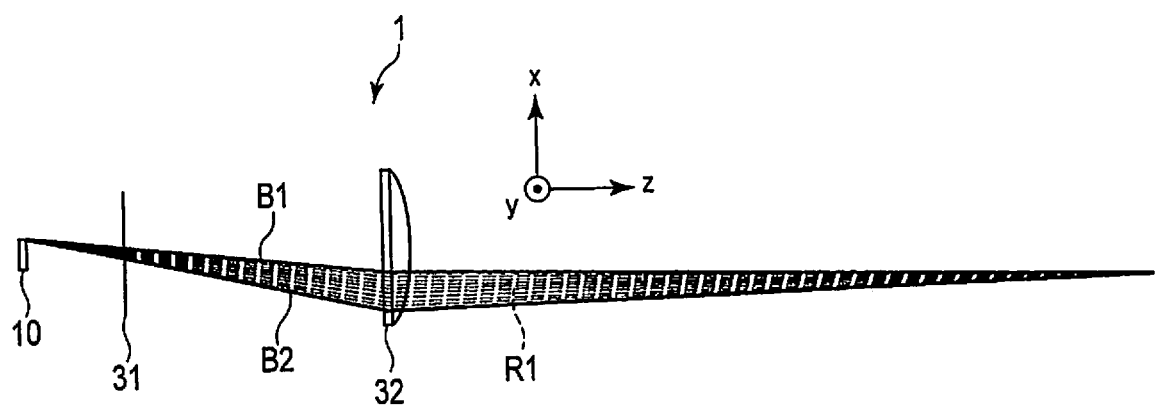
FIG. 3 is a side view schematically showing an example of the arrangement of the light emission side optical element group according to the first embodiment, explaining light beams after passing through the first light emission side aperture.

FIG. 1 is an x-z sectional view of the optical test apparatus 1 according to this embodiment. FIG. 2 is a bird's eye view of the illumination optical system of the optical test apparatus 1 according to the embodiment. FIG. 3 is an x-z sectional view of the illumination optical system of the optical test apparatus 1 according to the embodiment. In addition, each of FIGS. 1, 2, and 3 also shows a light beam diagram showing an example of the path of a light beam emitted from a light source 10.

The x-axis, the y-axis, and the z-axis in this embodiment each are defined as follows. The z-axis is the optical axis of the light source 10 and passes through the center of each optical element of the optical test apparatus 1. The +z direction is a direction from the light source 10 to an image sensor 20. The x-axis and the y-axis are perpendicular to each other and perpendicular to the z-axis. The −x direction is, for example, the gravity direction. In this case, for example, in an x-z sectional view of the optical test apparatus 1 as shown in FIG. 1, the +z direction is a direction from left to right, the −x direction is a direction from up to down, and the +y direction is a direction from rear to front in a direction perpendicular to the drawing surface.

As shown in FIG. 1, the optical test apparatus 1 includes the light source 10, the image sensor 20, and an optical element group.

The light source 10 includes a light emitting surface 11 on the side surface on the +z side. The light source 10 is, for example, an LED (Light Emitting Diode) and emits white light. Note that the light source 10 is not limited to an LED and may be an incandescent bulb, fluorescent bulb, mercury lamp, or the like. In addition, the color of light emission from the light source 10 is not limited to white. A wavelength included in a light beam emitted from the light source 10 is preferably decided in accordance with the wavelength selectivity of a first light emission side aperture and a first light reception side aperture (to be described later).

The image sensor 20 includes an imaging plane 21 on the −z side surface. The image sensor 20 is, for example, a CCD (Charge-Coupled Device). The image sensor 20 outputs the light reception position and light reception intensity of a light beam incident on the imaging plane 21. The image sensor 20 is not limited to a CCD, and may be an image sensor such as a CMOS (Complementary Metal-Oxide Semiconductor) or a light-receiving element.

The optical element group includes a light emission side optical element group 30 and a light reception side optical element group 40. In this case, the light source 10 and the light emission side optical element group 30 are included in an illumination optical system. The image sensor 20 and the light reception side optical element group 40 are included in an imaging optical system. That is, the optical test apparatus 1 can also be expressed as including the illumination optical system and the imaging optical system.

The light emission side optical element group 30 is arranged on the +z side of the light source 10. The light reception side optical element group 40 is arranged on the +z side of the light emission side optical element group 30. The image sensor 20 is arranged on the +z side of the light reception side optical element group 40. In the optical test apparatus 1, a test object 60 is arranged between the light emission side optical element group 30 and the light reception side optical element group 40.

The light emission side optical element group 30 includes a first light emission side aperture 31 (second aperture) and a light emission side lens 32 (second lens). The light reception side optical element group 40 includes a first light reception side aperture 41 (first aperture) and a light reception side lens 42 (first lens). The first light emission side aperture 31 is arranged on the +z side of the light source 10. The light emission side lens 32 is arranged on the +z side of the first light emission side aperture 31. The first light reception side aperture 41 is arranged on the +z side of the light emission side lens 32. The light reception side lens 42 is arranged on the +z side of the first light reception side aperture 41. The test object 60 is arranged between the light emission side lens 32 and the light reception side lens 42.

The first light emission side aperture 31 is arranged such that the opening of the first light emission side aperture 31 is arranged on the focal plane of the light emission side lens 32. The first light reception side aperture 41 is arranged such that the opening of the first light reception side aperture 41 is located at the focal plane of the light reception side lens 42. In this case, the focal plane is a plane on which an object at infinity is imaged by the lens. With this arrangement, a light beam exiting from a point on the aperture plane of the first light emission side aperture 31 is formed into an image at a point on the aperture plane of the first light reception side aperture 41. That is, the aperture plane of the first light emission side aperture 31 is conjugate to the aperture plane of the first light reception side aperture 41.

Figure 4A:
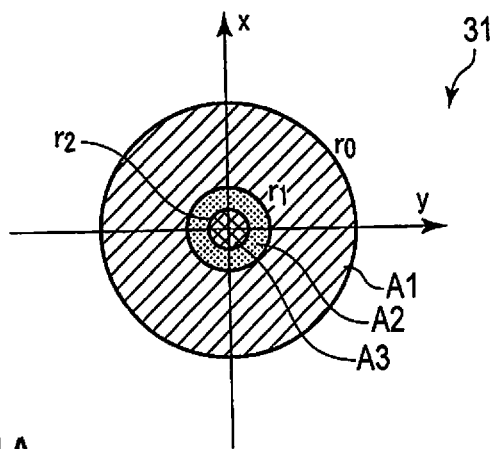
FIG. 4A is an x-y sectional view showing an example of the arrangement of the first light emission side aperture according to the first embodiment.
Figure 4B:
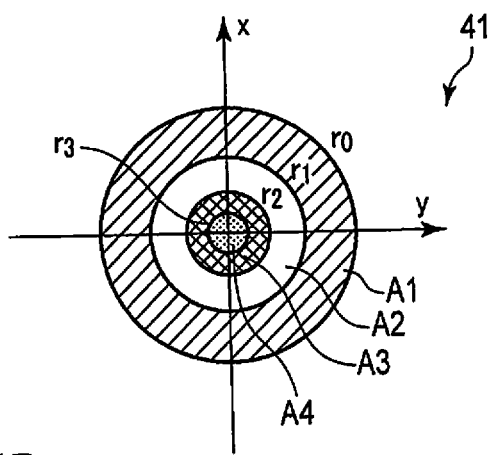
FIG. 4B is an x-y sectional view showing an example of the arrangement of a first light reception side aperture according to the first embodiment.

The arrangement of each of the first light emission side aperture 31 and the first light reception side aperture 41 will be described in detail below. The first light emission side aperture 31 and the first light reception side aperture 41 each include a support member having an opening and a wavelength selecting member provided at the opening. The wavelength selecting member has the property of transmitting a light beam having a specific wavelength (wavelength spectrum). The wavelength selecting member can include a transparent member that transmits light beams having any wavelengths in the visible light range and a black member that does not transmit light beams having any wavelengths in the visible light range. FIG. 4A is a schematic view showing an x-y section of the opening of the first light emission side aperture 31. FIG. 4B is a schematic view showing an x-y section of the first light reception side aperture 41.

As shown in FIGS. 4A and 4B, the opening of the first light emission side aperture 31 and the opening of the first light reception side aperture 41 each are provided with a wavelength selecting region. Each wavelength selecting region is divided into at least two wavelength selecting regions. Although each wavelength selecting region may have any shape, this embodiment will exemplify a case in which a plurality of wavelength selecting regions are provided in a concentric pattern. In addition, the radii of the respective concentric circles defining wavelength selecting regions are written as rn (n=0, 1, 2, . . . ) from the outside for the respective apertures. In this case, the values of nr can differ from each other for the respective apertures.

As shown in FIG. 4A, the wavelength selecting region of the first light emission side aperture 31 according to this embodiment is divided into three regions in a concentric pattern, namely a first region A1, a second region A2, and a third region A3. The first region A1 is a region ranging from a radius r1 to a radius r0. The first region A1 transmits no visible light. That is, the color of a wavelength selecting member forming the first region A1 is black. The second region A2 is a region ranging from a radius r2 to the radius r1. The second region A2 transmits a blue light beam. That is, the color of a wavelength selecting member forming the second region A2 is blue. Note that, in practice, transmitted visible light looks blue and the color of the member is a complementary color to blue. In this case, for the sake of convenience, such a member is called a blue member. The third region A3 is a region ranging over the radius r2 and the less. The third region A3 transmits a red light beam. The color of a wavelength selecting unit forming the third region A3 is red. Note that, in practice, transmitted visible light looks red and the color of the member is a complementary color to red. In this case, for the sake of convenience, such a member is called a red member.

As shown in FIG. 4B, the wavelength selecting region of the first light reception side aperture 41 according to this embodiment is divided into four concentric regions in a concentric pattern, namely a first region A1, a second region A2, a third region A3, and a fourth region A4. The first region A1 is a region ranging from the radius r1 to the radius r0. The first region A1 transmits no visible light. That is, the color of a wavelength selecting member forming the first region A1 is black. The second region A2 is a region ranging from the radius r2 to the radius r1. The second region A2 transmits visible light (white light). The color of a wavelength selecting member forming the second region A2 is transparent. The third region A3 is a region ranging from a radius r3 to the radius r2. The third region A3 transmits a red light beam. That is, the color of a wavelength selecting member forming the third region A3 is red. The fourth region A4 is a region ranging over the radius r3 or less. The fourth region A4 transmits a blue light beam. That is the color of a wavelength selecting member forming the fourth region A4 is blue.

Assume that in this case, the peak wavelength of a wavelength spectrum of, for example, a red light beam is 650 nm. In addition, assume that the peak wavelength of the wavelength spectrum of a blue light beam is 450 nm.

In this case, a region that is located in the +z direction with reference to the light emitting surface 11 and is illuminated by irradiation with a light beam is defined as an irradiation region. In addition, an arbitrary plane existing in the irradiation region is defined as a light beam irradiation plane. Note, however, that the following will exemplify a case in which an irradiation plane is an imaging plane of the light emitting surface 11.

The light emission side lens 32 forms a light beam emitted from a point on the light emitting surface 11 into an image at a point on the irradiation plane. In this case, the irradiation plane is conjugate to the light emitting surface 11. The light reception side lens 42 forms a light beam emitted from a point on the test surface into an image at a point on the imaging plane 21. In this case, the test surface is an arbitrary plane perpendicular to the z-axis inside the test object 60. In this case, the test surface is a conjugate surface to the imaging plane 21. The light emission side lens 32 forms a light beam emitted from a point on the light emitting surface 11 into an image at a point on the imaging plane 21 via the light reception side lens 42. When the irradiation plane is flush with the test surface, the light emitting surface 11 and the imaging plane 21 can be expressed as having a conjugate relationship. The light emission side lens 32 forms a light beam emitted from a point on the aperture plane of the first light emission side aperture 31 into an image at a point on the aperture plane of the first light reception side aperture 41 via the light reception side lens 42. In this case, the aperture plane of the first light emission side aperture 31 is conjugate to the aperture plane of the first light reception side aperture 41.

Although the light emission side lens 32 and the light reception side lens 42 are formed from, for example, optical glass, this is not exhaustive. The light emission side lens 32 and the light reception side lens 42 may be formed from optical plastics such as PMMA (acrylic resin) or PC (polycarbonate).

Note that the focal length of the light emission side lens 32 may be equal to or different from the focal length of the light reception side lens 42. Note, however, that when the focal length of the light emission side lens 32 is different from the focal length of the light reception side lens 42, the size of the opening of the first light reception side aperture 41 is equal to the product of the size of the opening of the first light emission side aperture 31 and an enlargement/reduction magnification. In this case, the enlargement/reduction magnification is decided by the ratio between the focal length of the light emission side lens 32 and the focal length of the light reception side lens 42.

This embodiment will exemplify a case in which the focal length of the light emission side lens 32 is equal to the focal length of the light reception side lens 42. In this case, the radius r0, the radius r1, and the radius r2 of the first light emission side aperture 31 shown in FIG. 4A are equal to the radius r0, the radius r2, and the radius r3 of the first light reception side aperture 41 shown in FIG. 4B.

As shown in FIG. 1, the optical test apparatus 1 further include a processing circuit 50. The processing circuit 50 is an integrated circuit such as a CPU (Central Processing Unit) or ASIC (Application Specific Integrated Circuit). As the processing circuit, a general-purpose computer may be used. The processing circuit 50 calculates information concerning the test object 60 based on an output from the image sensor 20. For example, the processing circuit 50 calculates the deflection angle of a light beam caused by refraction or scattering by the test object 60 based on the magnitude of a time-series change in the intensity of a light beam reaching the imaging plane. The processing circuit 50 estimates the refractive index distribution or scattering intensity on the test object 60 from the calculated deflection angle. The processing circuit 50 may be located outside the optical test apparatus 1. In this case, an output from the image sensor 20 may be output outside the optical test apparatus 1 or recorded in a recording circuit. That is, the calculation of information concerning the test object 60 based on an output from the image sensor 20 may be performed inside or outside the optical test apparatus 1.

Note that the optical test apparatus 1 may include a recording circuit. For example, the recording circuit stores outputs from the image sensor 20 or the processing circuit 50. Although the recording circuit is a nonvolatile memory such as a flash memory, it may further include a volatile memory.

The following description will exemplify a case in which a measurement target (test object 60) for the optical test apparatus 1 according to this embodiment is a solid object. However, this is not exhaustive. A measurement target may be a liquid or gas as long as it is a medium that can refract or scatter a light beam.

The operation of the optical test apparatus 1 according to this embodiment will be described in detail next with reference to the accompanying drawings. Note, however, that the following description will exemplify a case in which an irradiation plane is the imaging plane of the light emitting surface 11 and is conjugate to the light emitting surface 11.

The light source 10 emits white light from the light emitting surface 11 in the +z direction. Light beams (a light beam R1, a light beam B1, and a light beam B2) emitted from one point on the light emitting surface 11 of the light source 10 are incident on the first light emission side aperture 31, as shown in FIG. 1. In this case, the light beam R1 is a light beam incident on the third region A3 of the first light emission side aperture 31. The light beam B1 and the light beam B2 are light beams incident on the second region A2 of the first light emission side aperture 31.

The first light emission side aperture 31 transmits light beams incident on the second region A2 and the third region A3. At this time, because the second region A2 transmits light beams having blue-wavelength spectra, the light beam B1 and the light beam B2 are blue light. Likewise, because the third region A3 transmits light beams having red-wavelength spectra, the light beam R1 is red light. The following description will be made on the assumption that a light beam transmitted through the first light emission side aperture 31 is a light beam having a wavelength and intensity that allow the light beam to be transmitted through the test object 60.

An operation to be performed when the test object 60 is not arranged will be described first. A light beam exiting from a point on the aperture plane of the first light emission side aperture 31 is formed into an image at a point on the aperture plane of the first light reception side aperture 41 via the light emission side lens 32 and the light reception side lens 42. That is, the aperture plane of the first light emission side aperture 31 is conjugate to the aperture plane of the first light reception side aperture 41.

The light beam R1 transmitted through the third region A3 of the first light emission side aperture 31 is incident on the fourth region A4 of the first light reception side aperture 41. In addition, the light beam B1 and the light beam B2 transmitted through the second region A2 of the first light emission side aperture 31 are incident on the third region A3 of the first light reception side aperture 41. In this case, the fourth region A4 of the first light reception side aperture 41 is a region that transmits blue light. In addition, the third region A3 of the first light reception side aperture 41 is a region that transmits red light. For this reason, when the test object 60 is not arranged, all light beams are absorbed by the first light reception side aperture 41 and hence do not reach the imaging plane 21. That is, when the test object 60 is not arranged, a light beam emitted from a point on the light emitting surface 11 is not imaged.

The operation to be performed when the test object 60 is arranged will be described next.

A light beam transmitted through the first light emission side aperture 31 irradiates the test object 60 via the light emission side lens 32. At this time, a light beam emitted from a point on the light emitting surface 11 is formed into an image on the irradiation plane. The irradiation plane is located on or in the surface of the test object 60. In this case, the light emitting surface 11 of the light source 10 is conjugate to the irradiation plane.

In this case, a surface perpendicular to an optical axis (z-axis) passing through the test object 60 will be referred to as a test surface. Light beams passing through the test surface are incident on the first light reception side aperture 41 via the light reception side lens 42. Note that the first light emission side aperture 31 and the first light reception side aperture 41 are conjugate to each other with respect to the lens. However, in the presence of the test surface, it is not known whether the light beams incident on the first light reception side aperture 41 are formed into images on the aperture plane of the first light reception side aperture 41.

In this case, a light beam is deflected by refraction or scattering by the test object 60. For this reason, for example, the deflected light beam R1 exits as a light beam R2 from the test surface. The light beam R2 is incident on the third region A3 of the first light reception side aperture 41. In this case, the light beam R2 is red light, and the third region A3 of the first light reception side aperture 41 is a region that transmits red light. For example, the deflected light beams B1 and B2 respectively exit as light beams B3 and B4 from the test surface. The light beam B3 is incident on the fourth region A4 of the first light reception side aperture 41. In this case, the light beam B3 is blue light, and the fourth region A4 of the first light reception side aperture 41 is a region that transmits blue light. The light beam B4 is incident on the second region A2 of the first light reception side aperture 41. In this case, the light beam B4 is blue light, and the second region A2 of the first light reception side aperture 41 is a region that transmits visible light (white light). That is, when the test object 60 is arranged, the light beam B3, the light beam B4, and the light beam R2, which are deflected by refraction or scattering by the test object 60, pass through the aperture plane of the first light reception side aperture 41.

A light beam that exits from a point on the test surface and passes through the first light reception side aperture 41 is formed into an image at a point on the imaging plane 21 by the light reception side lens 42. That is, the test surface is conjugated to the imaging plane 21 of the image sensor 20. The light beam formed into an image on the imaging plane 21 is imaged. The processing circuit 50 acquires the intensity of the light beam that has reached the imaging plane 21.

In this case, as a deflection angle Θ of a light beam increases, the amount of light beam that can pass through the aperture plane of the first light reception side aperture 41 increases, thus increasing the intensity of the light beam reaching the imaging plane 21. That is, the magnitude of a deflection angle is calculated based on the intensity of a light beam received by the image sensor 20. In addition, a deflection angle depends on a refractive index distribution or scattering intensity. The processing circuit 50 can therefore estimate a refractive index distribution or scattering intensity based on the calculated magnitude of the deflection angle.

Note that the irradiation plane and the test surface may different planes or the same plane. When the irradiation plane coincides with the test surface, the light emitting surface 11 of the light source 10 is conjugate to the imaging plane 21 of the image sensor 20 in the optical test apparatus 1.

The optical test apparatus 1 and the optical test method according to this embodiment have the following effects.

The optical test apparatus 1 according to this embodiment includes the first light reception side aperture 41 (first aperture) having the first aperture plane provided with the wavelength selecting region (first wavelength selecting region), the first light emission side aperture 31 (second aperture) having the second aperture plane provided with the wavelength selecting region (second wavelength selecting region) different from that of the first light reception side aperture 41, the image sensor 20 that images a light beam passing through the aperture planes of the first and second aperture planes and reaching the imaging plane 21, and the light reception side lens 42 (first lens) that causes a light beam passing through the first aperture plane and the second aperture plane to be incident on the imaging plane 21. The optical test method according to the embodiment is configured to image a light beam exiting from the test surface of the test object 60, passing through the first light reception side aperture 41 (first aperture) having the first aperture plane provided with the wavelength selecting region (first wavelength selecting region) and the first light emission side aperture 31 (second aperture) having the second aperture plane provided with the wavelength selecting region (second wavelength selecting region) different from that of the first light reception side aperture 41, and reaching the imaging plane 21 and acquire information concerning the test object 60 based on the acquired intensity of the light beam.

Such arrangement and method have the effect of being able to acquire the magnitude of a deflection angle caused by the test object 60 as information concerning the test object 60, contactlessly and accurately, based on the intensity of a light beam transmitted through the test object 60. In addition, such arrangement and method have the effect of being able to acquire a refractive index distribution or scattering intensity on the test object 60 as information concerning the test object 60 based on the acquired magnitude of a deflection angle.

In the optical test apparatus 1 and the optical test method according to this embodiment, a light beam (for example, a red light beam) that can pass through the central region of the first aperture plane of the first light reception side aperture 41 (first aperture) is absorbed by the central region of the second aperture plane of the first light emission side aperture 31 (second aperture), and a light beam (for example, a blue light beam) that can pass through the central region of the second aperture plane is absorbed by the central region of the first aperture plane. In addition, in the optical test apparatus 1 according to the embodiment, the wavelength selecting regions of the first light reception side aperture 41 (first aperture) and the first light emission side aperture 31 (second aperture) each are divided into two regions, namely a central region and a peripheral region different in wavelength selectivity from the central region, a light beam passing through the peripheral region of the second aperture plane of the first light emission side aperture 31 (second aperture) can pass through the central region of the first aperture plane of the first light reception side aperture 41 (first aperture), and a light beam passing through the central region of the second aperture plane can pass through the peripheral region of the first aperture plane.

The optical test apparatus 1 according to this embodiment further includes the light source 10 and the light emission side lens 32 (second lens) that irradiates the test object 60 with a light beam emitted from the light source 10 and passing through the first light emission side aperture 31 (second aperture). The first aperture plane of the first light reception side aperture 41 (first aperture) is conjugate to the second aperture plane of the first light emission side aperture 31. In addition, in the optical test apparatus 1 according to the embodiment, the light emitting surface 11 of the light source 10 is conjugate to the imaging plane 21. Furthermore, in the optical test apparatus 1 according to the embodiment, the first aperture plane of the first light reception side aperture 41 (first aperture) is arranged on the focal plane of the light emission side lens 32 (second lens) via the light reception side lens 42 (first lens), and the second aperture plane of the first light emission side aperture 31 (second aperture) is arranged on the focal plane of the light emission side lens 32.

According to such arrangement and method, a light beam that is not deflected by the test object 60 does not reach the imaging plane 21 due to the wavelength selectivity of the first light reception side aperture 41 and the first light emission side aperture 31 regardless of the presence/absence of the test object 60. In contrast to this, a light beam deflected by the test object 60 reaches the imaging plane 21. Accordingly, the optical test apparatus 1 and the optical test method according to this embodiment have the effect of being able to acquire information concerning the test object 60 without performing measurement in a state (reference state) in which a light beam is not defected by the test object 60.

In the optical test apparatus 1 according to this embodiment, a light beam to be imaged by the image sensor 20 is a light beam defected by the test object 60. The optical test apparatus 1 according to the embodiment further includes the processing circuit 50 that calculates a refractive index distribution or scattering intensity on the test object 60 based on the intensity of a light beam reaching the imaging plane 21. According to this arrangement, it is possible to calculate the magnitude of the deflection angle of a light beam, caused by the test object 60, transmitted through the test object 60, calculate a refractive index distribution or scattering intensity on the test object 60 based on the acquired magnitude of the deflection angle, and output the calculated values as information concerning the test object 60.

Note that an optical element group may be configured to cause the first light reception side aperture 41 to absorb a light beam transmitted through the first light emission side aperture 31 when the test object 60 is arranged. When, for example, a refractive index distribution or scattering intensity on the test object 60 is known while a light beam transmitted through the first light emission side aperture 31 is absorbed by the first light reception side aperture 41, the same effects as those of the embodiment described above can be obtained. Even when a refractive index distribution or scattering intensity on the test object 60 is not known, the presence/absence of a change in the test object 60 can be detected.

(First Modification of First Embodiment)

The optical test apparatus 1 according to this modification will be described in detail below with reference to the accompanying drawings. Differences from the first embodiment will be mainly described below. The same reference numerals denote the same parts, and a description of them will be omitted.

Figure 5A:
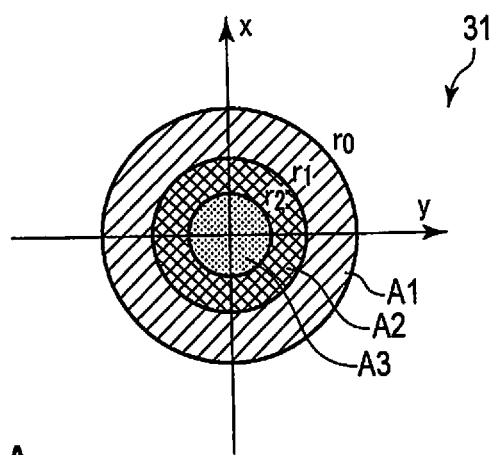
FIG. 5A is an x-y sectional view showing an example of the arrangement of the first light emission side aperture according to the first modification of the first embodiment.
Figure 5B:
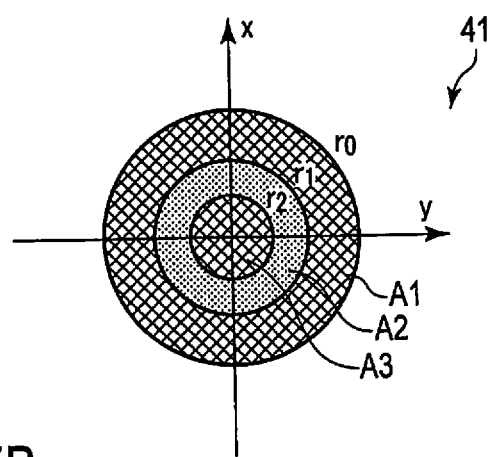
FIG. 5B is an x-y sectional view showing an example of the arrangement of the first light reception side aperture according to the first modification of the first embodiment.

The arrangement of the optical test apparatus 1 according to this modification will be described first. FIG. 5A is a schematic view showing an x-y section of the opening of the first light emission side aperture 31 according to the modification. FIG. 5B is a schematic view showing an x-y section of the opening of the first light reception side aperture 41 according to the modification.

As shown in FIG. 5A, the wavelength selecting region of the first light emission side aperture 31 according to this modification is divided into three regions in a concentric pattern, namely a first region A1, a second region A2, and a third region A3. The first region A1 is a black region that ranges from the radius r1 to the radius r0 and transmits no visible light. The second region A2 is a red region that ranges from the radius r2 to the radius r1 and transmits red light. The third region A3 is a region that ranges over the radius r2 and less and transmits blue light.

As shown in FIG. 5B, the wavelength selecting region of the first light reception side aperture 41 according to this modification is divided into three regions in a concentric pattern, namely a first region A1, a second region A2, and a third region A3. The first region A1 is a region that ranges from the radius r1 to the radius r0 and transmits red light. The second region A2 is a region that ranges from the radius r2 to the radius r1 and transmits blue light. The third region A3 is a region that ranges over the radius r2 and less and transmits red light.

When the focal length of the light emission side lens 32 is equal to that of the light reception side lens 42, the radius r0, the radius r1, and the radius r2 of the first light emission side aperture 31 are respectively equal to the radius r0, the radius r1, and the radius r2 of the first light reception side aperture 41.

The operation of the optical test apparatus 1 according to this modification will be described next.

In the optical test apparatus 1 according to this modification, when the test object 60 is not arranged, blue light transmitted through the third region A3 of the first light emission side aperture 31 is absorbed by the third region A3 of the first light reception side aperture 41. In addition, red light transmitted through the second region A2 of the first light emission side aperture 31 is absorbed by the second region A2 of the first light reception side aperture 41. As described above, light beams that are not deflected are entirely absorbed by the aperture plane of the first light reception side aperture 41 and hence do not reach the imaging plane 21.

On the other hand, when the test object 60 is arranged, blue light transmitted through the third region A3 of the first light emission side aperture 31 is deflected by the test object 60 and transmitted through the second region A2 of the first light reception side aperture 41. In addition, red light transmitted through the second region A2 of the first light emission side aperture 31 is deflected by the test object 60 and is transmitted through the first region A1 or the third region A3 of the first light reception side aperture 41. As described above, a deflected light beam is transmitted through the first light reception side aperture 41 and reaches the imaging plane 21.

The processing circuit 50 acquires the intensity of a light beam reaching the imaging plane 21 based on an output from the image sensor 20. In this case, the larger the deflection angle, the larger the amount of a light beam passing through the aperture plane of the first light reception side aperture 41, resulting in an increase in the amount of blue light reaching the imaging plane 21. In addition, the larger the deflection angle, the larger the amount of a light beam passing through the aperture plane of the first light reception side aperture 41, resulting in an increase in the amount of red light reaching the imaging plane 21. In this manner, the processing circuit 50 can estimate the magnitude of a deflection angle based on an acquired light beam intensity.

The processing circuit 50 further acquires a light beam intensity for each wavelength (color). When scattering has wavelength dependence, the processing circuit 50 can quantitively measure the wavelength dependence of scattering by the test object 60. In general, the surface of each object has a unique scattering characteristic, and hence the processing circuit 50 can estimate the surface texture and material of the object based on the wavelength characteristic of scattering. When, for example, a large amount of blue light is transmitted, the test object 60 is estimated to have a surface texture or material that causes strong scattering of blue light. Likewise, when, for example, a large amount of red light is transmitted, the test object 60 is estimated to have a surface texture or material that causes strong scattering of red light.

(Second Modification of First Embodiment)

The optical test apparatus 1 according to this modification will be described in detail below with reference to the accompanying drawings. Differences from the first embodiment will be mainly described below. The same reference numerals denote the same parts, and a description of them will be omitted.

Figure 6A:
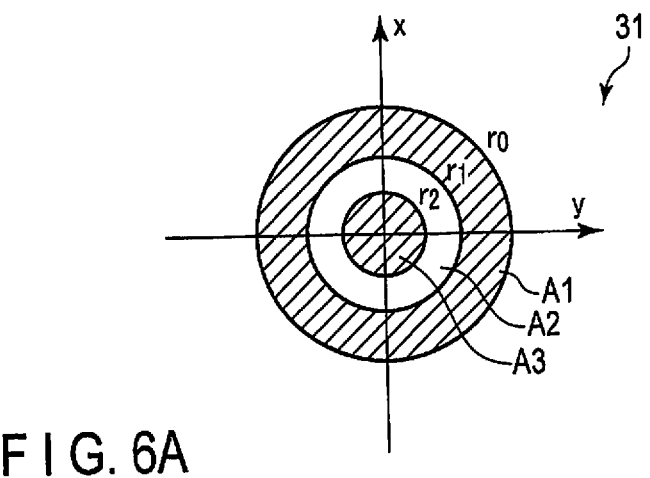
FIG. 6A is an x-y sectional view showing an example of the arrangement of the first light emission side aperture according to the second modification of the first embodiment.
Figure 6B:
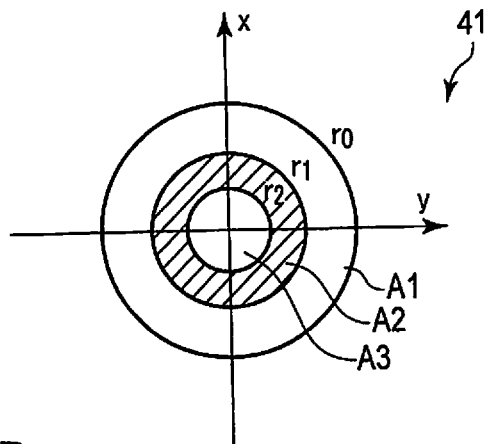
FIG. 6B is an x-y sectional view showing an example of the arrangement of the first light reception side aperture according to the second modification of the first embodiment.

The arrangement of the optical test apparatus 1 according to this modification will be described first. FIG. 6A is a schematic view showing an x-y section of the opening of the first light emission side aperture 31 according to the modification. FIG. 6B is a schematic view showing an x-y section of the opening of the first light reception side aperture 41 according to the modification.

As shown in FIG. 6A, the wavelength selecting region of the first light emission side aperture 31 according to this modification is divided into three regions in a concentric pattern, namely a first region A1, a second region A2, and a third region A3. The first region A1 is a black region that ranges from the radius r1 to the radius r0 and transmits no visible light. The second region A2 is a transparent region that ranges from the radius r2 to the radius r1 and transmits visible light (white light). The third region A3 is a black region that ranges over the radius r2 and less and transmits no visible light.

As shown in FIG. 6B, the wavelength selecting region of the first light reception side aperture 41 according to this modification is divided into three regions in a concentric pattern, namely a first region A1, a second region A2, and a third region A3. The first region A1 is a transparent region that ranges from the radius r1 to the radius r0 and transmits visible light (white light). The second region A2 is a black region that ranges from the radius r2 to the radius r1 and transmits no visible light. The third region A3 is a transparent region that ranges over the radius r2 and less and transmits visible light (white light).

When the focal length of the light emission side lens 32 is equal to that of the light reception side lens 42, the radius r0, the radius r1, and the radius r2 of the first light emission side aperture 31 are respectively equal to the radius r0, the radius r1, and the radius r2 of the first light reception side aperture 41.

The operation of the optical test apparatus 1 according to this modification will be described next.

In the optical test apparatus 1 according to this modification, when the test object 60 is not arranged, visible light (white light) transmitted through the second region A2 of the first light emission side aperture 31 is absorbed by the second region A2 of the first light reception side aperture 41. As described above, light beams that are not deflected are entirely absorbed by the aperture plane of the first light reception side aperture 41 and hence do not reach the imaging plane 21.

On the other hand, when the test object 60 is arranged, visible light (white light) transmitted through the second region A2 of the first light emission side aperture 31 is deflected by the test object 60 and transmitted through the first region A1 or the third region A3 of the first light reception side aperture 41. As described above, a deflected light beam is transmitted through the first light reception side aperture 41 and reaches the imaging plane 21.

The processing circuit 50 acquires the intensity of a light beam reaching the imaging plane 21 based on an output from the image sensor 20. In this case, the larger the deflection angle, the larger the amount of a light beam passing through the aperture plane of the first light reception side aperture 41, resulting in an increase in the amount of white light reaching the imaging plane 21. In this manner, the processing circuit 50 can estimate the magnitude of a deflection angle based on an acquired light beam intensity.

(Third Modification of First Embodiment)

The optical test apparatus 1 according to this modification will be described in detail below with reference to the accompanying drawings. Differences from the first embodiment will be mainly described below. The same reference numerals denote the same parts, and a description of them will be omitted.

Figure 7A:
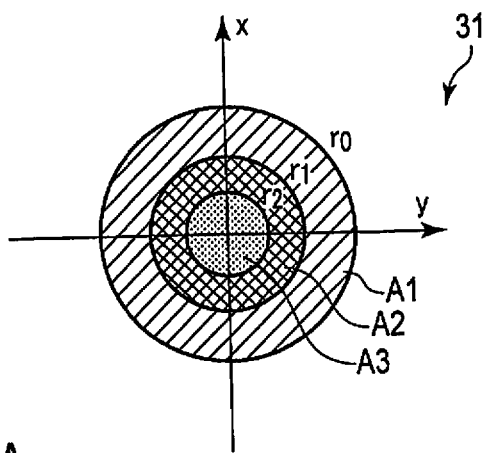
FIG. 7A is an x-y sectional view showing an example of the arrangement of the first light emission side aperture according to the third modification of the first embodiment.
Figure 7B:
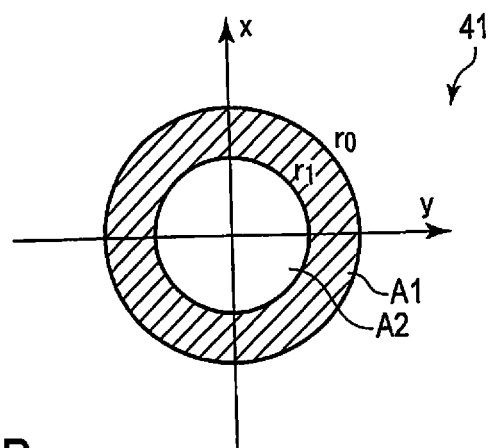
FIG. 7B is an x-y sectional view showing an example of the arrangement of the first light reception side aperture according to the third modification of the first embodiment.

The arrangement of the optical test apparatus 1 according to this modification will be described first. FIG. 7A is a schematic view showing an x-y section of the opening of the first light emission side aperture 31 according to the modification. FIG. 7B is a schematic view showing an x-y section of the opening of the first light reception side aperture 41 according to the modification.

As shown in FIG. 7A, the wavelength selecting region of the first light emission side aperture 31 according to this modification is divided into three regions in a concentric pattern, namely a first region A1, a second region A2, and a third region A3. The first region A1 is a black region that ranges from the radius r1 to the radius r0 and transmits no visible light. The second region A2 is a region that ranges from the radius r2 to the radius r1 and transmits red light. The third region A3 is a region that ranges over the radius r2 and less and transmits blue light.

As shown in FIG. 7B, the wavelength selecting region of the first light reception side aperture 41 according to this modification is divided into two regions in a concentric pattern, namely a first region A1 and a second region A2. The first region A1 is a black region that ranges from the radius r1 to the radius 3:0 and transmits visible light. The second region A2 is a transparent region that ranges over the radius r1 and less and transmits visible light (white light).

When the focal length of the light emission side lens 32 is equal to that of the light reception side lens 42, the radius r0 and the radius r1 of the first light emission side aperture 31 are respectively equal to the radius r0 and the radius r1 of the first light reception side aperture 41.

The operation of the optical test apparatus 1 according to this modification will be described next.

In the optical test apparatus 1 according to this modification, when the test object 60 is not arranged, blue light transmitted through the third region A3 of the first light emission side aperture 31 is transmitted through the third region A3 of the first light reception side aperture 41. In addition, red light transmitted through the second region A2 of the first light emission side aperture 31 is transmitted through the second region A2 of the first light reception side aperture 41. As described above, light beams that are not deflected are transmitted through the first light reception side aperture 41 and reach the imaging plane 21.

On the other hand, when the test object 60 is arranged, blue light transmitted through the third region A3 of the first light emission side aperture 31 is deflected by the test object 60 and transmitted through the second region A2 of the first light reception side aperture 41 as in the case in which the test object 60 is not arranged. However, when red light transmitted through the second region A2 of the first light emission side aperture 31 is deflected by a predetermined value or more by the test object 60, the red light is incident on the first region A1 of the first light reception side aperture 41 and absorbed. As described above, a red light beam deflected by a predetermined value or more is absorbed by the first light reception side aperture 41, and hence does not reach the imaging plane 21.

The processing circuit 50 acquires the intensity of a light beam reaching the imaging plane 21 for each wavelength (color) based on an output from the image sensor 20. In this case, the larger the deflection angle, the smaller the amount of red light beam passing through the aperture plane of the first light reception side aperture 41 as compared with a blue light beam, resulting in a reduction in the amount of red light reaching the imaging plane 21. As described above, the processing circuit 50 can estimate the magnitude of a deflection angle based on a light beam intensity for each wavelength (color).

(Fourth Modification of First Embodiment)

The optical test apparatus 1 according to this modification will be described in detail below with reference to the accompanying drawings. Differences from the first embodiment will be mainly described below. The same reference numerals denote the same parts, and a description of them will be omitted.

Figure 8A:
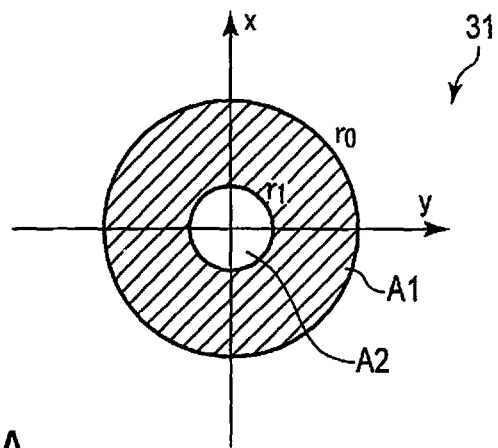
FIG. 8A is an x-y sectional view showing an example of the arrangement of the first light emission side aperture according to the fourth modification of the first embodiment.
Figure 8B:
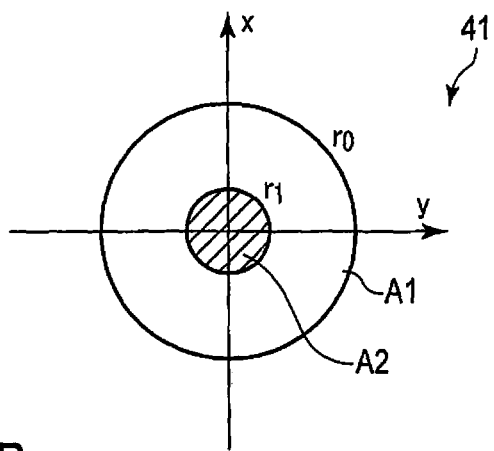
FIG. 8B is an x-y sectional view showing an example of the arrangement of the first light reception side aperture according to the fourth modification of the first embodiment.

The arrangement of the optical test apparatus 1 according to this modification will be described first. FIG. 8A is a schematic view showing an x-y section of the opening of the first light emission side aperture 31 according to the modification. FIG. 8B is a schematic view showing an x-y section of the opening of the first light reception side aperture 41 according to the modification.

As shown in FIG. 8A, the wavelength selecting region of the first light emission side aperture 31 according to this modification is divided into two regions in a concentric pattern, namely a first region A1 and a second region A2. The first region A1 is a black region that ranges from the radius r1 to the radius r0 and transmits no visible light. The second region A2 is a transparent region that ranges over the radius r1 and less and transmits visible light (white light).

As shown in FIG. 6B, the wavelength selecting region of the first light reception side aperture 41 according to this modification is divided into two regions in a concentric pattern, namely a first region A1 and a second region A2. The first region A1 is a transparent region that ranges from the radius r1 to the radius r0 and transmits visible light (white light). The second region A2 is a black region that ranges over the radius r1 and less and transmits no visible light.

When the focal length of the light emission side lens 32 is equal to that of the light reception side lens 42, the radius r0 and the radius r1 of the first light emission side aperture 31 are respectively equal to the radius r0 and the radius r1 of the first light reception side aperture 41.

The operation of the optical test apparatus 1 according to this modification will be described next.

In the optical test apparatus 1 according to this modification, when the test object 60 is not arranged, visible light (white light) transmitted through the second region A2 of the first light emission side aperture 31 is absorbed by the second region A2 of the first light reception side aperture 41. As described above, light beams that are not deflected are entirely absorbed by the aperture plane of the first light reception side aperture 41, and hence do not reach the imaging plane 21.

On the other hand, when the test object 60 is arranged, visible light (white light) transmitted through the second region A2 of the first light emission side aperture 31 is deflected by the test object 60 and transmitted through the first region A1 of the first light reception side aperture 41. As described above, a deflected light beam is transmitted through the first light reception side aperture 41 and reaches the imaging plane 21.

The processing circuit 50 acquires the intensity of a light beam reaching the imaging plane 21 based on an output from the image sensor 20. In this case, the larger the deflection angle, the larger the amount of light beam passing through the aperture plane of the first light reception side aperture 41, resulting in an increase in the amount of white light reaching the imaging plane 21. As described above, the processing circuit 50 can estimate the magnitude of a deflection angle based on the acquired light beam intensity of white light.

(Fifth Modification of First Embodiment)

The optical test apparatus 1 according to this modification will be described in detail below with reference to the accompanying drawings. Differences from the first embodiment will be mainly described below. The same reference numerals denote the same parts, and a description of them will be omitted.

The arrangement of the optical test apparatus 1 according to this modification will be described. FIG. 9 is a schematic view schematically showing an example of the arrangement of the light emission side optical element group 30 according to the modification. The schematic view shown in FIG. 9 is a sectional view including the z-axis of the light emission side optical element group 30 according to the modification. The schematic view shown in FIG. 9 also shows an example of the light beam paths of light beams emitted from points on light emitting surfaces 11.

As shown in FIG. 9, the light emission side optical element group 30 according to the modification further includes a light emission side half mirror 33. The light emission side half mirror 33 is arranged on the −z side of the light emission side lens 32. The light emission side half mirror 33 transmits part of a light beam incident from the −z side toward the +z direction and reflects part of a light beam incident from a direction perpendicular to the z-axis toward the +z direction. The optical axis of a light beam incident from the −z side to the light emission side half mirror 33 is written as the first optical axis, and the optical axis of a light beam incident from a direction perpendicular to the z-axis to the light emission side half mirror 33 is written as the second optical axis. In this case, the first optical axis is located on the z-axis. Both the optical axis of a light beam incident on the light emission side half mirror 33 along the first optical axis and transmitted through the light emission side half mirror 33 and the optical axis of a light beam incident on the light emission side half mirror 33 along the second optical axis and reflected by the light emission side half mirror 33 are located on the z-axis.

The light source 10 according to this modification includes a first light source 10a and a second light source 10b. The first light source 10a and the second light source 10b each are identical to the light source 10 according to the first embodiment, and is a light source such as an LED that emits white light. The light emitting surface 11 according to the modification includes a first light emitting surface 11a and a second light emitting surface 11b. The first light emitting surface 11a is arranged on a side surface of the first light source 10a on the +z side such that the optical axis is located on the first optical axis (z-axis). The second light emitting surface 11b is arranged on a side surface of the second light source 10b which faces the z-axis such that the optical axis is located on the second optical axis.

In this case, a light beam emitted from a point on the first light emitting surface 11a is formed into an image at a point on the irradiation plane by the light emission side lens 32. Likewise, a light beam emitted from a point on the second light emitting surface 11b is formed into an image at a point on the irradiation plane by the light emission side lens 32. That is, the first light emitting surface 11a and the second light emitting surface 11b are conjugate to the irradiation plane. Note that when the irradiation plane is flush with the test surface, the first light emitting surface 11a, the second light emitting surface 11b, and the imaging plane 21 can be expressed as having a conjugate relationship.

The first light emission side aperture 31 according to this modification includes a second light emission side aperture 31a and a third light emission side aperture 31b. The second light emission side aperture 31a is arranged between the first light source 10a and the light emission side half mirror 33. The second light emission side aperture 31a is arranged on the focal plane of the light emission side lens 32. The center of the second light emission side aperture 31a is on the first optical axis. The third light emission side aperture 31b is arranged between the second light source 10b and the light emission side half mirror 33. The third light emission side aperture 31b is arranged at the position of the focal plane of the light emission side lens 32 via the light emission side half mirror 33. The center of the third light emission side aperture 31b is on the second optical axis.

A light beam emitted from a point on the aperture plane of the second light emission side aperture 31a is formed into an image at a point on the aperture plane of the first light reception side aperture 41. Likewise, a light beam emitted from a point on the aperture plane of the third light emission side aperture 31b is formed into an image at a point on aperture plane of the first light reception side aperture 41. That is, the aperture plane of the second light emission side aperture 31a and the aperture plane of the third light emission side aperture 31b each are conjugate to the aperture plane of the first light reception side aperture 41.

The arrangement of each of the second light emission side aperture 31a and the third light emission side aperture 31b will be described in more detail below. FIG. 10A is a schematic view showing an x-y section of the opening of the second light emission side aperture 31a (first light emission side aperture 31) according to this modification. FIG. 10B is a schematic view showing an x-y section of the opening of the third light emission side aperture 31b (first light emission side aperture 31) according to the modification.

As shown in FIG. 10A, the wavelength selecting region of the second light emission side aperture 31a (first light emission side aperture 31) according to this modification is divided into two regions in a concentric pattern, namely a first region A1 and a second region A2. The first region A1 is a black region that ranges from the radius r1 to the radius r0 and transmits no visible light. The second region A2 is a region that ranges over the radius r1 and less and transmits red light.

As shown in FIG. 10B, the wavelength selecting region of the third light emission side aperture 31b (first light emission side aperture 31) according to this modification is divided into two regions in a concentric pattern, namely a first region A1 and a second region A2. The first region A1 is a region that ranges from the radius r1 to the radius r0 and transmits blue light. The second region A2 is a black region that ranges over the radius r1 and less and transmits no visible light.

Note that both the second light emission side aperture 31a and the third light emission side aperture 31b are arranged on the focal plane of the light emission side lens 32.

Accordingly, the radius r0 and the radius r1 of the second light emission side aperture 31a are equal to the radius r0 and the radius r1 of the third light emission side aperture 31b.

Note that the radius r0 and the radius r1 of the first light emission side aperture 31 (the second light emission side aperture 31a and the third light emission side aperture 31b) according to this modification are equal to the radius r1 and the radius r2 of the first light emission side aperture 31 according to the first embodiment.

The light emission side optical element group 30 according to this modification emits the same light beams as those emitted from the light emission side optical element group 30 according to the first embodiment. Accordingly, the optical test apparatus 1 according to the modification has the same effects as those obtained by the optical test apparatus 1 according to the first embodiment. In addition, the first light emission side aperture 31 according to the modification has a simpler arrangement than the first light emission side aperture 31 according to the first embodiment, and hence can be easily manufactured. This enables a reduction in cost.

Second Embodiment

An optical test apparatus 1 according to this embodiment will be described in detail below with reference to the accompanying drawings. Differences from the first embodiment will be mainly described below. The same reference numerals denote the same parts, and a description of them will be omitted.

Figure 11:
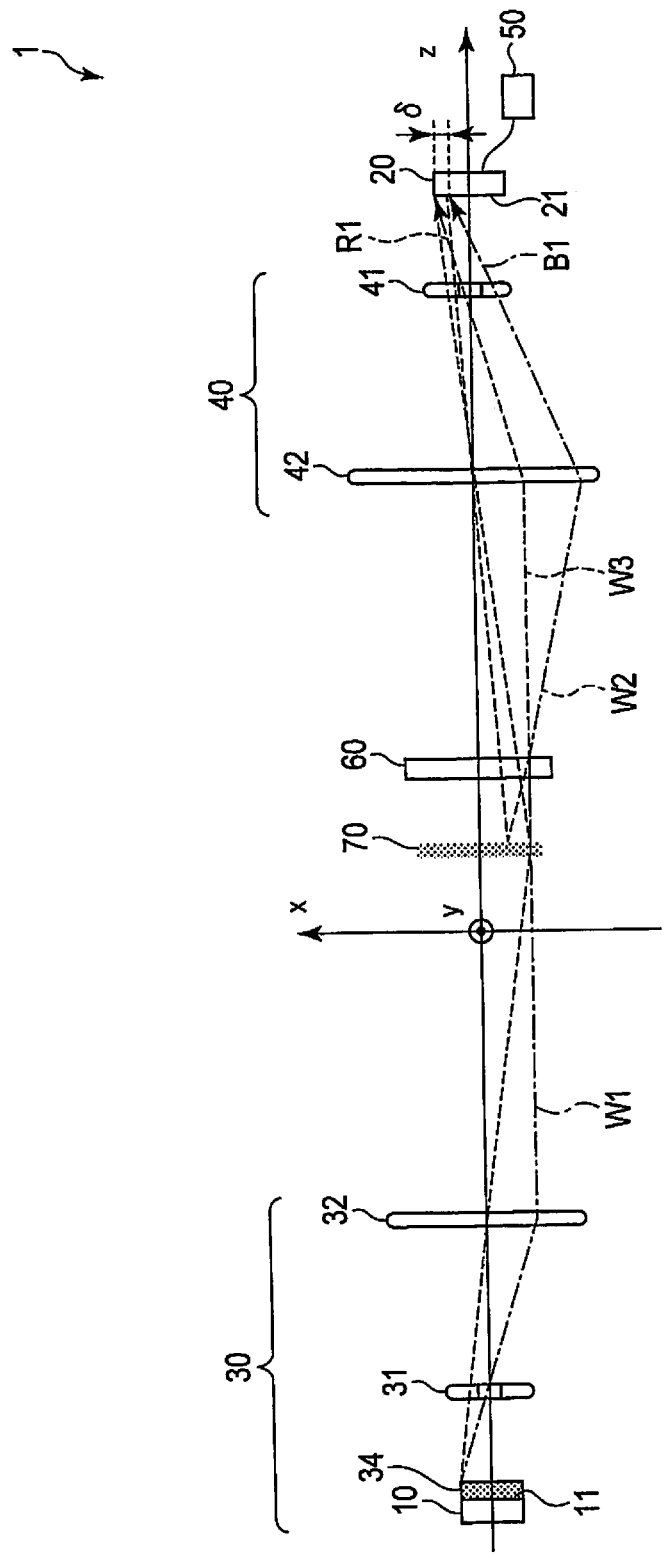
FIG. 11 is a schematic view schematically showing an example of the arrangement of an optical test apparatus according to the second embodiment.

The arrangement of the optical test apparatus 1 according to this embodiment will be described first. FIG. 11 is a schematic view schematically showing an example of the arrangement of the optical test apparatus 1 according to the embodiment. FIG. 11 is a sectional view including the z-axis of the optical test apparatus 1 according to the embodiment.

A light emission side optical element group 30 according to this embodiment includes a fourth light emission side aperture 34 (third aperture). The fourth light emission side aperture 34 is arranged between a light source 10 and a first light emission side aperture 31 (second aperture). The aperture plane of the fourth light emission side aperture 34 is a transmission type dot pattern plane. A light beam transmitted through the fourth light emission side aperture 34 can be projected as, for example, dot pattern 70 shown in FIG. 11. The dot pattern plane can be any plane that can project a dot-like pattern, and has an arrangement obtained by providing a plurality of hole portions in a black plate. The aperture plane (dot pattern plane) of the fourth light emission side aperture 34 is arranged so as to be conjugate to an imaging plane 21 by a light emission side lens 32 (second lens) and a light reception side lens 42 (first lens). The light reception side lens 42 (first lens) according to this embodiment is similar to, for example, the light reception side lens 42 according to the first embodiment.

Figure 12A:
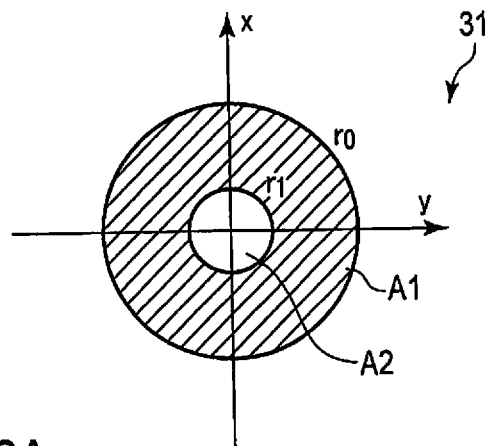
FIG. 12A is an x-y sectional view showing an example of the arrangement of a first light emission side aperture according to the second embodiment.
Figure 12B:
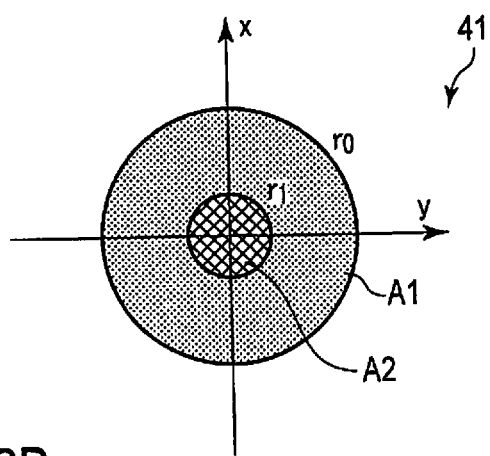
FIG. 12B is an x-y sectional view showing an example of the arrangement of a first light reception side aperture according to the second embodiment.

The arrangements of the first light emission side aperture 31 and a first light reception side aperture 41 (first aperture) according to this embodiment will each be described in more detail below. FIG. 12A is a schematic view showing an x-y section of the opening of the first light emission side aperture 31 according to this modification. FIG. 12B is a schematic view showing an x-y section of the opening of the first light reception side aperture 41 according to the modification.

As shown in FIG. 12A, the wavelength selecting region of the first light emission side aperture 31 according to this embodiment is divided into two regions in a concentric pattern, namely a first region A1 and a second region A2. The first region A1 is a black region that ranges from a radius r1 to a radius r0 and transmits no visible light. The second region A2 is a transparent region that ranges over the radius r1 and less and transmits visible light (white light).

As shown in FIG. 12B, the wavelength selecting region of the first light reception side aperture 41 according to this embodiment is divided into two regions in a concentric pattern, namely a first region A1 and a second region A2. The first region A1 is a region that ranges from the radius r1 to the radius r0 and transmits blue light. The second region A2 is a region that ranges over the radius r1 and less and transmits red light.

When the focal length of the light emission side lens 32 is equal to that of the light reception side lens 42, the radius r0 and the radius r1 of the first light emission side aperture 31 are respectively equal to the radius r0 and the radius r1 of the first light reception side aperture 41.

The operation of the optical test apparatus 1 according to this embodiment will be described next. FIG. 11 shows an example of the light beam paths of light beams emitted from points on a light emitting surface 11.

In the optical test apparatus 1 according to this embodiment, light beams emitted from the respective dots on the dot pattern plane (the aperture plane of the fourth light emission side aperture 34) are incident on the first light emission side aperture 31. Of the light beams incident on the first light emission side aperture 31, a light beam W1 transmitted through the second region A2 of the first light emission side aperture 31 irradiates the test object 60 via the light emission side lens 32.

In this case, the light beam W1 that is not scattered by a test object 60 exits as a light beam W3 from the test surface. The light beam W3 is transmitted through the second region A2 of the first light reception side aperture 41 and reaches, as a red light beam R1, the imaging plane 21.

On the other hand, the light beam W1 that is scattered by the test object 60 is deflected by scattering, and exits as a light beam W2 from the test surface. The light beam W2 is transmitted through the first region A1 of the first light reception side aperture 41 and reaches, as a blue light beam B1, the imaging plane 21.

As described above, light beams emitted from the respective dots on the dot pattern plane (the aperture plane of the fourth light emission side aperture 34) are divided into dots of two colors, namely a blue dot and a red dot on the imaging plane 21. A processing circuit 50 acquires the intensity of a light beam reaching the imaging plane 21 for each wavelength (color) based on an output from an image sensor 20. In this case, the larger the deflection angle, the larger a distance δ between corresponding dots of two colors on the imaging plane 21. Accordingly, the processing circuit 50 calculates the magnitude of the deflection angle based on the acquired moving distance (distance δ) of each dot.

The optical test apparatus 1 according to this embodiment has the following effects.

The optical test apparatus 1 according to this embodiment further includes a fourth light emission side aperture (third aperture) having an aperture plane provided with a dot-pattern wavelength selecting region and arranged at a position to face the light emitting surface 11 of the light source 10. This arrangement has the effect of being able to specify which one of light beams reaching the imaging plane 21 is emitted from the same point on the light emitting surface 11. That is, this arrangement has the effect of being able to acquire the magnitude of a deflection angle caused by the test object 60 as information concerning the test object 60 contactlessly and accurately based on the position of a light beam on the imaging plane 21 which is transmitted through the test object 60. In addition, the arrangement has the effect of being able to acquire a refractive index distribution or scattering intensity on the test object 60 as information concerning the test object 60 based on the acquired magnitude of the deflection angle.

Note that corresponding dots of two colors on the imaging plane 21 are detected by, for example, pattern matching. In this case, the respective hole portions provided on the dot pattern plane may have different shapes.

In the optical test apparatus 1 according to this embodiment, a light beam to be imaged by the image sensor 20 is a light beam deflected by the test object 60. The optical test apparatus 1 according to the embodiment further includes a processing circuit 50 that acquires a light beam position on the imaging plane 21 for each wavelength corresponding to the wavelength selecting region (first wavelength selecting region) of the first light reception side aperture 41 (first aperture), and calculates a refractive index distribution or scattering intensity on the test object 60 based on the interval (distance δ) between the position of a light beam passing through the central region of the first aperture plane of the first light reception side aperture 41 and the position of a light beam passing through a peripheral region of the first aperture plane. This arrangement can calculate the magnitude of the deflection angle of a light beam, caused by the test object 60, transmitted through the test object 60, calculate a refractive index distribution or scattering intensity on the test object 60 based on the acquired magnitude of the deflection angle, and output the calculated values as information concerning the test object 60.

Note that the distance δ may be calculated from the comparison between the position of a red dot on the imaging plane 21 which is acquired while the test object 60 is not arranged and the position of a blue dot on the imaging plane 21 which is acquired while the test object 60 is arranged.

Third Embodiment

An optical test apparatus 1 according to this embodiment will be described in detail below with reference to the accompanying drawings. Differences from the second embodiment will be mainly described below. The same reference numerals denote the same parts, and a description of them will be omitted.

Figure 13:
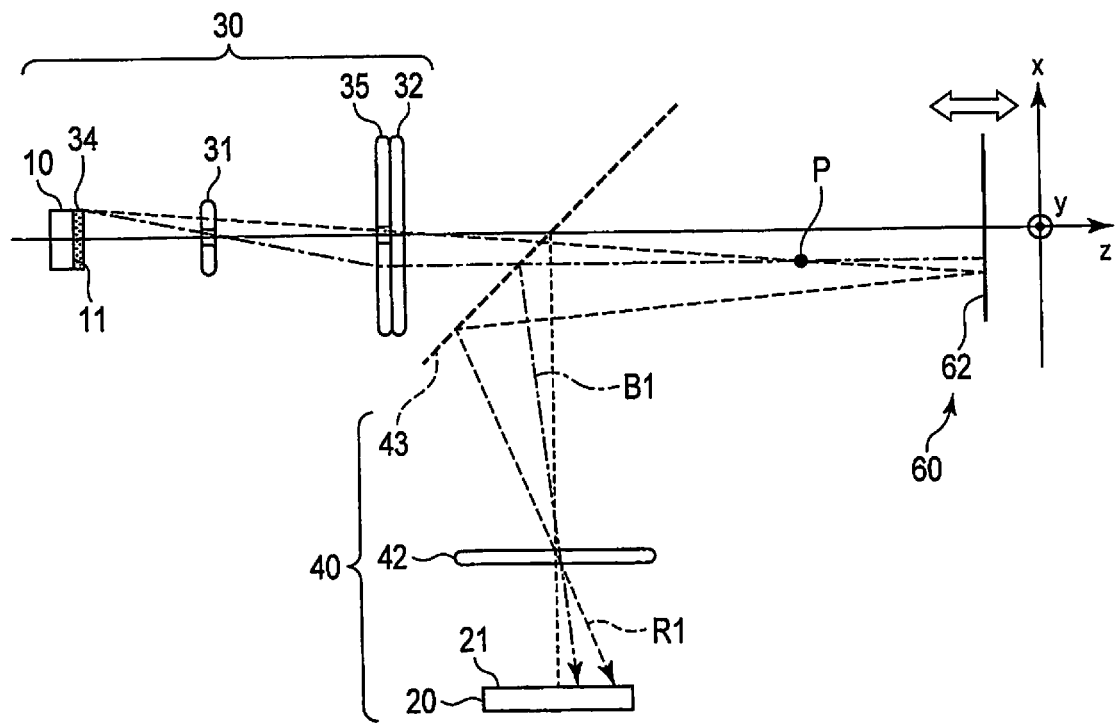
FIG. 13 is a schematic view schematically showing an example of the arrangement of an optical test apparatus according to the third embodiment.

The arrangement of the optical test apparatus 1 according to this embodiment will be described first. FIG. 13 is a schematic view schematically showing an example of the arrangement of the optical test apparatus 1 according to the embodiment. FIG. 13 is a sectional view including the z-axis of the optical test apparatus 1 according to the embodiment.

A light emission side optical element group 30 according to this embodiment includes a fifth light emission side aperture 35 (second aperture). The fifth light emission side aperture 35 has, for example, the same outer diameter as that of a light emission side lens 32 (second lens) and is arranged to be in contact with the light emission side lens 32. The fifth light emission side aperture 35 is arranged on the −z side of the light emission side lens 32. The first light emission side aperture 31 (first aperture) is arranged on the −z side of the fifth light emission side aperture 35, and a fourth light emission side aperture 34 (a third aperture with a dot pattern plane) is arranged on the +z side. The fourth light emission side aperture 34 (dot pattern plane) is arranged on the +z side of a light emitting surface 11. A light reception side lens 42 (first lens) according to this embodiment, for example, is identical to the light reception side lens 42 according to the second embodiment.

Figure 14A:
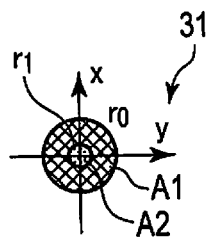
FIG. 14A is an x-y sectional view showing an example of the arrangement of a first light emission side aperture according to the third embodiment.
Figure 14B:
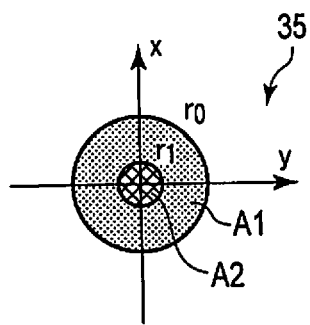
FIG. 14B is an x-y sectional view showing an example of the arrangement of a fifth light emission side aperture according to the third embodiment.

FIG. 14A is a schematic view showing an x-y section of the opening of a first light emission side aperture 31 according to this embodiment. FIG. 14B is a schematic view showing an x-y section of the opening of the fifth light emission side aperture 35 according to the embodiment.

As shown in FIG. 14A, the wavelength selecting region of the first light emission side aperture 31 according to this embodiment is divided into two regions in a concentric pattern, namely a first region A1 and a second region A2. The first region A1 is a region that ranges from a radius r1 to a radius r0 and transmits red light. The second region A2 is a region that ranges over the radius r1 and less and transmits blue light.

As shown in FIG. 14B, the wavelength selecting region of the fifth light emission side aperture 35 according to this embodiment is divided into two regions in a concentric pattern, namely a first region A1 and a second region A2. The first region A1 is a region that ranges from the radius r1 to the radius r0 and transmits blue light. The second region A2 is a region that ranges over the radius r1 and less and transmits red light. For example, the radius r0 is almost the same as that of the light emission side lens 32.

Note that the fifth light emission side aperture 35 may be arranged on the +z side of the light emission side lens 32. A light reception side optical element group 40 according to this embodiment may not include the first light reception side aperture 41 arranged on the focal plane of the light reception side lens 42 according to the second embodiment.

The light emission side optical element group 30 according to this embodiment does not include the light emission side half mirror 33. On the other hand, the light reception side optical element group 40 according to the embodiment further includes a light reception side half mirror 43, as shown in FIG. 13. The light reception side half mirror 43 is arranged on the +z side of the light emission side lens 32. A test object 60 according to the embodiment is arranged on the +z side of the light reception side half mirror 43. The light reception side half mirror 43 transmits part of a light beam incident from the −z side toward the +z direction. In addition, the light reception side half mirror 43 reflects part of a light beam incident from the +z side toward a direction (third optical axis direction) perpendicular to the z-axis. The light reception side lens 42 and an imaging plane 21 according to the embodiment are arranged such that the center is located on the third optical axis.

Figure 15:
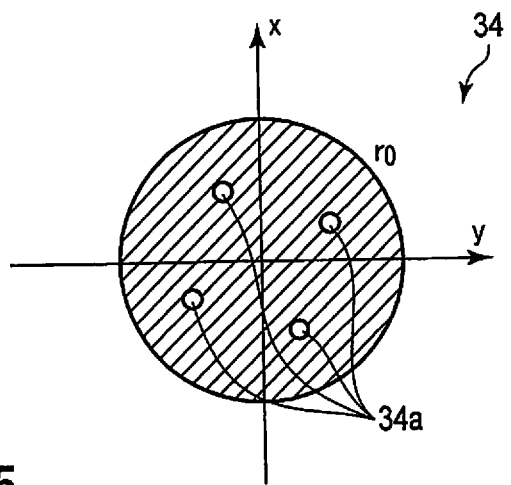
FIG. 15 is an x-y sectional view showing an example of the arrangement of a fourth light emission side aperture according to the third embodiment.

FIG. 15 is a schematic view showing an x-y section of the opening of the fourth light emission side aperture 34 according to this embodiment, explaining an example of a dot pattern plane. The aperture plane of the fourth light emission side aperture 34 is provided with four hole portions 34a. The four hole portions 34a are arranged at, for example, the positions of the vertices of a square. In the fourth light emission side aperture 34, the hole portions 34a are transparent regions that transmit visible light (white light), and regions other than the hole portions 34a are black regions that transmit no visible light.

The operation of the optical test apparatus 1 according to this embodiment will be described next. FIG. 13 shows an example of the light beam path of a light beam emitted from a point on a light emitting surface 11.

A light beam B1 emitted from a point on the light emitting surface 11 passes through a region (the second region A2 of the first light emission side aperture 31) that is a central region of the aperture plane of the first light emission side aperture 31 and transmits a blue light beam, and passes through a region (the first region A1 of the fifth light emission side aperture 35) that is a peripheral region of the aperture plane of the fifth light emission side aperture 35 and transmits a blue light beam. The light beam B1 transmitted through the fifth light emission side aperture 35 is made by the light emission side lens 32 to become a light beam parallel to the z-axis. The light beam B1 passes through the light emission side lens 32 and is then transmitted through the light reception side half mirror 43 in the +z direction. The light beam B1 transmitted through the light reception side half mirror 43 irradiates the test object 60. The light beam B1 irradiating the test object 60 is reflected by the test surface of the test object 60. The light beam B1 reflected by the test surface is reflected by the light reception side half mirror 43, and propagates in a direction to separate from the z-axis in the third optical axis direction. The light beam B1 reflected by the light reception side half mirror 43 reaches the imaging plane 21 via the light reception side lens 42.

A light beam R1 emitted from a point on the light emitting surface 11 passes through a region (the first region A1 of the first light emission side aperture 31) which is a peripheral region of the aperture plane of the first light emission side aperture 31 and transmits a red light beam, and passes through a region (the second region A2 of the fifth light emission side aperture 35) which is the center of the aperture plane of the fifth light emission side aperture 35 and transmits a red light beam. The light beam R1 transmitted through the fifth light emission side aperture 35 passes through the light emission side lens 32 and is transmitted through the light reception side half mirror 43 to irradiate the test object 60. The light beam R1 reflected by the test surface of the test object 60 is reflected by the light reception side half mirror 43 and reaches the imaging plane 21 via the light reception side lens 42.

The light beam B1 and the light beam R1 reaching the imaging plane 21 are imaged. The processing circuit 50 acquires the positions of the light beam B1 and the light beam R1 on the imaging plane 21. In this manner, the optical test apparatus 1 according to this embodiment images a light beam scattered or reflected by the surface of the test object 60 or a portion near the surface. Accordingly, the test object 60 according to this embodiment need not be transparent to a light beam transmitted through the first light emission side aperture 31.

Figure 16A:
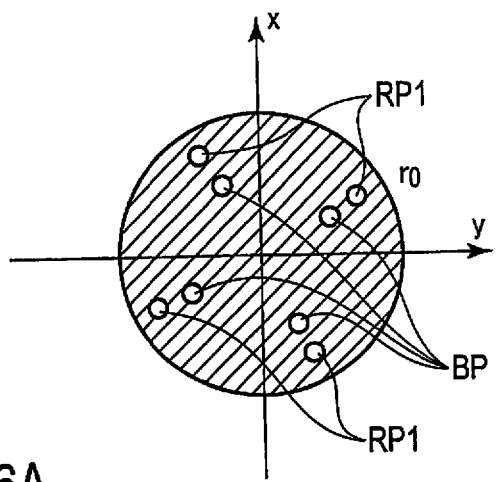
FIG. 16A is a schematic view showing an example of light beam positions on an imaging plane according to the third embodiment.
Figure 16B:
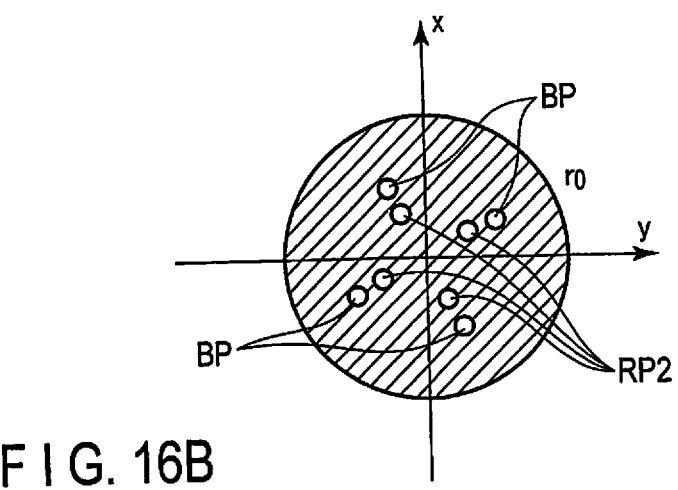
FIG. 16B is a schematic view showing an example of light beam positions on the imaging plane according to the third embodiment.

As shown in FIG. 13, in the optical test apparatus 1 according to this embodiment, a blue light beam and a red light beam intersect at a point (intersection point P) after being transmitted through the light reception side half mirror 43. The influences of the positional relationship between the test surface and the intersection point P on the positions of the light beam B1 and the light beam R1 on the imaging plane 21 will be described. FIG. 16A shows an example of an image captured when the test surface is located on a side (+z side) farther from the light source 10 than the intersection point P. FIG. 16B shows an example of an image captured when the test surface is located on a side (−z side) closer to the light source 10 than the intersection point P.

When the test surface is located on the side (+z side) farther from the light source 10 than the intersection point P, a position RP1 that a red light beam has reached is located on the imaging plane 21 outside relative to a position BP that a blue light beam has reached, as shown in FIG. 16A. In contrast to this, when the test surface is located on the side (−z side) closer to the light source 10 than the intersection point P, a position RP2 that a red light beam has reached is located on the imaging plane 21 closer to the central side (the third optical axis side) than the position BP that a blue light beam has reached, as shown in FIG. 16B. In this case, the light beam B1 is parallel to the z-axis between the light emission side lens 32 and the test surface. Accordingly, even when the position of the test surface (test object 60) changes, the position BP that a blue light beam has reached does not change.

The processing circuit 50 according to this embodiment can estimate the positional relationship between the test surface and the intersection point P based on the positional relationship between the light beam B1 and the light beam R1 in a captured image. The processing circuit 50 further calculates the distance between the light beam B1 and the light beam R1 in the captured image. The processing circuit 50 can estimate the distance between the intersection point P and the test surface based on the positional relationship and the distance between the light beam B1 and the light beam R1 in the captured image. That is, the optical test apparatus 1 according to this embodiment can estimate the position (z position) at which the test object 60 is arranged.

The optical test apparatus 1 and the optical test method according to this embodiment have the following effects.

The optical test apparatus 1 according to this embodiment includes the first light emission side aperture 31 (first aperture) having the first aperture plane provided with the wavelength selecting region (first wavelength selecting region), the fifth light emission side aperture 35 (second aperture) having the second aperture plane provided with the wavelength selecting region (second wavelength selecting region) different from that of the first light emission side aperture 31, an image sensor 20 that images a light beam passing through the first and second aperture planes and reaching the imaging plane 21, and the light reception side lens 42 (first lens) that makes a light beam passing through the first and second aperture planes be incident on the imaging plane 21. In addition, the optical test method according to this embodiment images a light beam exiting from the test surface of the test object 60, passing through the first light emission side aperture 31 (first aperture) having the first aperture plane provided with the wavelength selecting region (first wavelength selecting region) and the fifth light emission side aperture 35 (second aperture) having the second aperture plane provided with the wavelength selecting region (second wavelength selecting region) different from that of the first light emission side aperture 31, and reaching the imaging plane 21, and acquires information concerning the test object 60 based on the acquired light beam position of the light beam on the imaging plane 21.

Such arrangement and method have the effect of being able to acquire the distance (the position of the test object 60) between the test surface of the light emission side lens (second lens) as information concerning the test object 60 contactlessly and accurately based on the light beam position of a light beam on the imaging plane 21 which is reflected or scattered by the test surface of the test object 60.

In the optical test apparatus 1 and the optical test method according to this embodiment, a light beam (for example, a blue light beam) that can transmit through the central region of the first aperture plane of the first light emission side aperture 31 (first aperture) is absorbed by the central region of the second aperture surface of the fifth light emission side aperture 35 (second aperture), and a light beam (for example, a red light beam) that can transmit through the central region of the second aperture plane is absorbed by the central region of the first aperture plane. In addition, in the optical test apparatus 1 according to the embodiment, the wavelength selecting regions of the first light emission side aperture 31 (first aperture) and the fifth light emission side aperture 35 (second aperture) each are divided into two regions, namely a central region and a peripheral region different in wavelength selectivity from the central region. A light beam passing through the peripheral region of the second aperture plane of the fifth light emission side aperture 35 (second aperture) can pass through the central region of the first aperture plane of the first light emission side aperture 31 (first aperture), and a light beam passing through the central region of the second aperture plane can pass through the peripheral region of the first aperture plane.

The optical test apparatus 1 according to this embodiment further includes the light source 10 and the light emission side lens 32 (second lens) that irradiates the test object 60 with a light beam passing through the first aperture plane of the first light emission side aperture 31 and the second aperture plane of the fifth light emission side aperture 35. The first aperture plane is arranged on the focal plane of the light emission side lens 32, and the second aperture plane is arranged near the light emission side lens 32.

The optical test apparatus 1 according to this embodiment further includes the fourth light emission side aperture 34 (third aperture) having an aperture plane provided with a dot-pattern wavelength selecting region and arranged at a position to face the light emitting surface 11 of the light source 10.

According to such arrangement and method, a light beam path is limited for each wavelength by the wavelength selectivity of the first light emission side aperture 31 and the fifth light emission side aperture 35. The light beam position of a light beam (for example, a blue light beam) on the imaging plane 21 which passes through the central region of the first light emission side aperture 31 does not change regardless of the position of the test surface of the test object 60. In contrast to this, the light beam position of a light beam (for example, a red light beam) on the imaging plane 21 which passes through the central region of the fifth light emission side aperture 35 changes depending on the position of the test surface. Accordingly, the optical test apparatus 1 and the optical test method according to this embodiment can acquire the positional relationship between a light beam intersection point and the test surface of the test object 60 in the z direction as the positional relationship between the light beam positions on the imaging plane 21. In this case, the light beam intersection point is the intersection point between the light beam path of the light beam passing through the central region of the first light emission side aperture 31 and the light beam path of the light beam passing through the central region of the fifth light emission side aperture 35. In addition, the optical test apparatus 1 and the optical test method according to the embodiment can acquire the distance between the test surface of the test object 60 and the light beam intersection point as the interval between the light beam passing through the central region of the first light emission side aperture 31 and the light beam passing through the central region of the fifth light emission side aperture 35 on the imaging plane 21. In this case, the position of the light beam intersection point or the distance between the light emission side lens 32 (second lens) and the light beam intersection point is decided by the arrangement of the optical test apparatus 1 and hence can be handled as a known value.

In the optical test apparatus 1 according to this embodiment, a light beam to be imaged by the image sensor 20 is a light beam reflected or scattered by the test surface of the test object 60. The optical test apparatus 1 according to the embodiment further includes the processing circuit 50 that acquires a light beam position on the imaging plane 21 for each wavelength corresponding to the wavelength selecting region of the first light emission side aperture 31 (first aperture), and calculates the distance between the light reception side lens 42 (first lens) and the test surface of the test object 60 based on the interval and positional relationship between the light beam position of a light beam passing through the central region of the first aperture plane of the first light emission side aperture 31 and the light beam position of a light beam passing through the central region of the second aperture plane of the fifth light emission side aperture 35. According to this arrangement, it is possible to calculate the position of the test surface of the test object 60 and output the calculated position of the test surface as information concerning the test object 60 based on the light beam positions of light beams on the imaging plane 21 which are reflected or scattered by the test surface.

Fourth Embodiment

An optical test apparatus 1 according to this embodiment will be described in detail below with reference to the accompanying drawings. Differences from the third embodiment will be mainly described below. The same reference numerals denote the same parts, and a description of them will be omitted.

Figure 17:
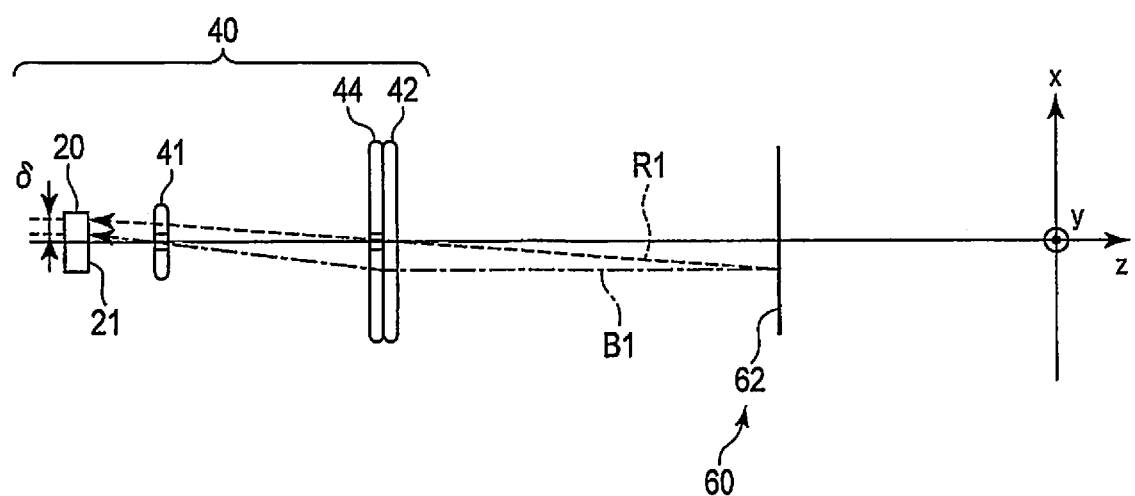
FIG. 17 is a schematic view schematically showing an example of the arrangement of an optical test apparatus according to the fourth embodiment.

The arrangement of the optical test apparatus 1 according to this embodiment will be described first. FIG. 17 is a schematic view schematically showing an example of the arrangement of the optical test apparatus 1 according to the embodiment. FIG. 17 is a sectional view including the z-axis of the optical test apparatus 1 according to the embodiment.

The optical test apparatus 1 according to this embodiment does not include the light emission side optical element group 30 unlike the optical test apparatus 1 according to the third embodiment. That is, the optical test apparatus 1 according to the embodiment is an imaging system. A light reception side optical element group 40 according to the embodiment includes a first light reception side aperture 41 (first aperture), a light reception side lens 42 (first lens), a second light reception side aperture 44 (second aperture), and an image sensor 20.

The arrangement and placement of the first light reception side aperture 41 according to this embodiment are the same as those of the first light emission side aperture 31 according to the third embodiment. The first light reception side aperture 41 is arranged on the focal plane of the light reception side lens 42. The arrangement and placement of the light reception side lens 42 according to the embodiment are the same as those of the light emission side lens 32 according to the third embodiment. The arrangement and placement of the second light reception side aperture 44 according to the embodiment are the same as those of the fifth light emission side aperture 35 according to the third embodiment. The arrangement of the image sensor 20 according to the embodiment is the same as that of the image sensor 20 according to the third embodiment. The image sensor 20 according to the embodiment is the same as that of the light source 10 according to the third embodiment.

The operation of the optical test apparatus 1 according to this embodiment will be described next. FIG. 17 shows an example of the light beam paths of light beams emitted from a point on a light emitting surface 11.

A light beam 31 and a light beam R1 exit from a point on the test surface. These light beams are obtained when environment light is reflected or scattered by the test surface.

The light beam B1 is incident on a region (a first region A1 of the second light reception side aperture 44) that is a peripheral region of the aperture plane of the second light reception side aperture 44 and transmits a blue light beam via the light reception side lens 42. A blue light beam B1 transmitted through the first region A1 of the second light reception side aperture 44 passes through a region (a second region A2 of the first light reception side aperture 41) that is the central region of the aperture plane of the first light reception side aperture 41 and transmits blue light, and reaches the imaging plane 21.

The light beam R1 is incident on a region (a second region A2 of the second light reception side aperture 44) that is the central region of the aperture plane of the second light reception side aperture 44 and transmits a red light beam via the light reception side lens 42. The red light beam R1 transmitted through the second region A2 of the second light reception side aperture 44 passes through a region (the first region A1 of the first light reception side aperture 41) that is the peripheral region of the aperture plane of the first light reception side aperture 41 and transmits a red light beam, and reaches the imaging plane 21.

The image sensor 20 outputs a light beam position on an imaging plane 21. In this case, a distance δ between the arrival point of the blue light beam B1 and the arrival point of the red light beam R1 on the imaging plane 21 is expressed as:

$$? ?$$

where h is the distance from the exit point of a light beam on the test surface to the optical axis, f is the distance from the light reception side lens 42 to the aperture plane of the first light reception side aperture 41, d is the distance from the aperture plane of the first light reception side aperture 41 to the imaging plane 21, and a is the distance from the light reception side lens 42 to the test surface. Note that the values of f and d are values decided by the arrangement of the optical test apparatus 1. These values may be recorded in a recording circuit or the like in advance or may be acquired for each operation based on a user input. A processing circuit 50 calculates the value of S based on an output from the image sensor 20. The processing circuit 50 calculates the value of h from the arrival point of the red light beam R1 on the imaging plane 21. The processing circuit 50 calculates the value of a, which is the distance from the light reception side lens 42 to the test surface, by using the acquired values of f and d, the calculated values of δ and h, and equation (1).

The optical test apparatus 1 according to this embodiment can calculate the distance from the light reception side lens 42 to the test surface in this manner based on the distance δ calculated from the captured image. That is, the optical test apparatus 1 according to the embodiment can estimate the position of the test surface in the z direction.

The optical test apparatus 1 and the optical test method according to this embodiment have the following effects.

The optical test apparatus 1 according to this embodiment includes the first light reception side aperture 41 (first aperture) having the first aperture plane provided with the wavelength selecting region (first wavelength selecting region), the second light reception side aperture 44 (second aperture) having the second aperture plane provided with the wavelength selecting region (second wavelength selecting region) different from that of the first light reception side aperture 41, the image sensor 20 that images a light beam passing through the first aperture plane and the second aperture plane and reaching the imaging plane 21, and the light reception side lens 42 (first lens) that makes a light beam passing through the first aperture plane and the second aperture plane be incident on the imaging plane 21. In addition, the optical test method according to the embodiment is configured to image a light beam exiting from the test surface of a test object 60, passing through the first light reception side aperture 41 (first aperture) having the first aperture plane provided with the wavelength selecting region (first wavelength selecting region) and the second light reception side aperture 44 (second aperture) having the second aperture plane provided with the wavelength selecting region (second wavelength selecting region) different from that of the first light reception side aperture 41, and reaching the imaging plane 21, and acquire information concerning the test object 60 based on the acquired light beam position on the imaging plane 21.

Such arrangement and method have the effect of being able to acquire the distance (the position of the test object 60) between the test surface of the test object 60 and the light emission side lens (second lens) as information concerning the test object 60 contactlessly and accurately based on the light beam position on the imaging plane 21 of an external light beam (environment light beam) reflected or scattered by the test surface of the test object 60.

In the optical test apparatus 1 and the optical test method according to this embodiment, a light beam (for example, a blue light beam) that can pass through the central region of the first aperture plane of the first light reception side aperture 41 (first aperture) is absorbed by the central region of the second aperture plane of the second light reception side aperture 44 (second aperture), and a light beam (for example, a red light beam) that can pass through the central region of the second aperture plane is absorbed by the central region of the first aperture plane. In addition, in the optical test apparatus 1 according to the embodiment, the wavelength selecting regions of the first light reception side aperture 41 (first aperture) and the second light reception side aperture 44 (second aperture) each are divided into two regions, namely a central region and a peripheral region different in wavelength selectivity from the central region. A light beam passing through the peripheral region of the second aperture plane of the second light reception side aperture 44 (second aperture) can pass through the central region of the first aperture plane of the first light reception side aperture 41 (first aperture), and a light beam passing through the central region of the second aperture plane can pass through the peripheral region of the first aperture plane.

In the optical test apparatus 1 according to this embodiment, the first aperture plane of the first light reception side aperture 41 (first aperture) is arranged on the focal plane of the light reception side lens 42 (first lens), and the second aperture plane of the second light reception side aperture 44 (second aperture) is arranged near the light reception side lens 42.

According to such arrangement and method, a light beam path is limited for each wavelength by the wavelength selectivity of the first light reception side aperture 41 and the second light reception side aperture 44. Accordingly, the optical test apparatus 1 and the optical test method according to this embodiment can acquire the distance between the test surface of the test object 60 and the light reception side lens 42 (first lens) as the interval between the light beam position of a light beam (for example, a blue light beam) passing through the central region of the first light reception side aperture 41 and a light beam passing through the central region of the second light reception side aperture 44 on the imaging plane 21. In this case, the position of the light reception side lens 42 is decided by the arrangement of the optical test apparatus 1 and hence can be handled as a known value.

In the optical test apparatus 1 according to this embodiment, a light beam to be imaged by the image sensor 20 is a light beam reflected or scattered by the test surface of the test object 60. The optical test apparatus 1 according to the embodiment further includes the processing circuit 50 that acquires a light beam position on the imaging plane 21 for each wavelength corresponding to the wavelength selecting region of the first light reception side aperture 41 (first aperture), and calculates the distance between the light reception side lens 42 (first lens) and the test surface of the test object 60 based on the interval between the light beam position of a light beam passing through the central region of the first aperture plane of the first light reception side aperture 41 and the light beam position of a light beam passing through the central region of the second aperture plane of the second light reception side aperture 44 (second aperture). According to this arrangement, it is possible to calculate the position of the test surface of the test object 60 and output the calculated position of the test surface as information concerning the test object 60 based on the light beam positions of light beams on the imaging plane 21 which are reflected or scattered by the test surface.

In the first embodiment, the first, second, third, and fifth modifications of the first embodiment, and the third embodiment, the light source 10 and the first light emission side aperture 31 can be replaced with an illumination apparatus including at least one light source such as an LED arranged in accordance with the arrangement of the first light emission side aperture 31. For example, in the fifth modification of the first embodiment, a first light source 10a and a second light emission side aperture 31a each may be at least one LED that emits red light. In this case, a red LED is arranged on the first optical axis or near the first optical axis. Likewise, for example, a second light source 10b and a third light emission side aperture 31b each may be at least one LED that emits blue light. In this case, a blue LED is arranged in an annular pattern center on the second optical axis. Likewise, in the second embodiment and the third embodiment, the light source 10 and the fourth light emission side aperture 34 can be replaced with an illumination apparatus including a plurality of light sources such as LEDs arranged in accordance with the dot pattern of the fourth light emission side aperture 34.

For example, the technique according to the fifth modification of the first embodiment can be applied to the light emission side optical element group 30 according to the first, second, and third modifications of the first embodiment, and the third embodiment. In addition, the technique according to the fifth modification of the first embodiment may be applied to the imaging side. Furthermore, for example, the apertures according to the above embodiments and the above modifications each may be a combination of a plurality of apertures. For example, the light emission side lens 32 and the light reception side lens 42 each may be a single lens or a compound lens obtained by combining a plurality of single lenses.

The techniques according to the respective embodiments and the modifications can measure information concerning a test object with high accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical test apparatus comprising:
a first aperture having a first aperture plane provided with a first wavelength selecting region;
a second aperture having a second aperture plane provided with a second wavelength selecting region different from the first wavelength selecting region;
an image sensor configured to image a light beam passing through the first aperture plane and the second aperture plane and reaching an imaging plane; and
a first lens configured to make a light beam passing through the first aperture plane and the second aperture plane be incident on the imaging plane;
wherein a light beam imaged by the image sensor is a light beam reflected or scattered by a test object, and
the apparatus further comprises a processing circuit configured to calculate a distance between the first lens and the test object based on an interval between a light beam position of a light beam passing through a central region of the first aperture plane and a light beam position of a light beam passing through a central region of the second aperture plane.

2. The apparatus of claim 1, wherein a light beam having a characteristic to pass through the central region of the first aperture plane is absorbed by the central region of the second aperture plane, and
a light beam having a characteristic to pass through the central region of the second aperture plane is absorbed by the central region of the first aperture plane.

3. The apparatus of claim 1, wherein the first wavelength selecting region and the second wavelength selecting region each are divided into two regions including the central region and a peripheral region different in wavelength selectivity from the central region,
a light beam passing through the peripheral region of the second aperture plane has a characteristic to pass through the central region of the first aperture plane, and
a light beam passing through the central region of the second aperture plane has a characteristic to pass through the peripheral region of the first aperture plane.

4. The apparatus of claim 1, wherein the first aperture plane is arranged on a focal plane of the first lens.

5. The apparatus of claim 1, further comprising:
a light source; and
a second lens configured to irradiate the test object with a light beam passing through the first aperture plane and the second aperture plane,
wherein the first aperture plane is arranged on a focal plane of the second lens.

6. The apparatus of claim 1, further comprising:
a light source; and
a second lens configured to irradiate the test object with a light beam emitted from the light source and passing through the second aperture,
wherein the aperture plane of the first aperture is conjugate to the aperture plane of the second aperture.

7. The apparatus of claim 4, wherein the processing circuit is further configured to acquire a light beam position on the imaging plane for each wavelength corresponding to the first wavelength selecting region.

8. The apparatus of claim 5, further comprising a third aperture having an aperture plane provided with a dot-pattern wavelength selecting region and arranged at a position to face a light emitting surface of the light source.

9. The apparatus of claim 5, wherein the processing circuit is further configured to acquire a light beam position on the imaging plane for each wavelength corresponding to the first wavelength selecting region.

10. The apparatus of claim 6, wherein a light emitting surface of the light source is conjugate to the imaging plane.

11. The apparatus of claim 6, wherein the first aperture plane is arranged on the focal plane of the second lens via the first lens, and the second aperture plane is arranged on the focal plane of the second lens.

12. The apparatus of claim 6, wherein a light beam imaged by the image sensor is a light beam deflected by the test object, and the processing circuit is further configured to calculate a refractive index distribution or scattering intensity on the test object based on an intensity of a light beam reaching the imaging plane.

13. The apparatus of claim 6, further comprising a third aperture having an aperture plane provided with a dot-pattern wavelength selecting region and arranged at a position to face the light emitting surface of the light source.

14. The apparatus of claim 13, wherein a light beam imaged by the image sensor is a light beam deflected by the test object, and the processing circuit is further configured to acquire a light beam position on the imaging plane for each wavelength corresponding to the first wavelength selecting region and calculate a refractive index distribution or scattering intensity on the test object based on an interval between a light beam position of a light beam passing through the central region of the first aperture plane and a light beam position of a light beam passing through the peripheral region of the first aperture plane.

15. An optical test method comprising:

imaging a light beam exiting from a test surface of a test object, passing through a first aperture having a first aperture plane provided with a first wavelength selecting region and a second aperture having a second aperture plane provided with a second wavelength selecting region different from the first wavelength selecting region, and reaching an imaging plane; and acquiring information concerning the test object based on an acquired light beam position or intensity of the light beam on the imaging plane, wherein a light beam imaged by the image sensor is a light beam reflected or scattered by the test object, and the method further comprises calculating a distance between the first lens and the test object based on an interval between a light beam position of a light beam passing through a central region of the first aperture plane and a light beam position of a light beam passing through a central region of the second aperture plane.

16. The method of claim 15, wherein a light beam having a characteristic to pass through the central region of the first aperture plane is absorbed by the central region of the second aperture plane, and a light beam having a characteristic to pass through the central region of the second aperture plane is absorbed by the central region of the first aperture plane.

* * * * *